United States Patent
Wang et al.

(10) Patent No.: US 12,250,598 B2
(45) Date of Patent: Mar. 11, 2025

(54) METHOD FOR SUPPORTING ACCESS TO CLOSED NETWORK, UE, BASE STATION AND READABLE STORAGE MEDIUM

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 17/424,041

(22) PCT Filed: Mar. 27, 2020

(86) PCT No.: PCT/KR2020/004237
§ 371 (c)(1),
(2) Date: Jul. 19, 2021

(87) PCT Pub. No.: WO2020/204501
PCT Pub. Date: Oct. 8, 2020

(65) Prior Publication Data
US 2022/0086705 A1 Mar. 17, 2022

(30) Foreign Application Priority Data
Mar. 29, 2019 (CN) .......................... 201910253354.X

(51) Int. Cl.
*H04W 36/00* (2009.01)
*H04W 36/08* (2009.01)
(Continued)

(52) U.S. Cl.
CPC .... *H04W 36/0038* (2013.01); *H04W 36/0011* (2013.01); *H04W 48/02* (2013.01);
(Continued)

(58) Field of Classification Search
CPC . H04W 36/0038; H04W 36/08; H04W 48/02; H04W 48/16; H04W 76/19;
(Continued)

(56) References Cited

U.S. PATENT DOCUMENTS

2010/0157943 A1  6/2010 Horn
2012/0039302 A1  2/2012 Chun et al.
(Continued)

FOREIGN PATENT DOCUMENTS

CN  102123394 A  7/2011
CN  105554828 A  5/2016
(Continued)

OTHER PUBLICATIONS

3GPP; TSG RAN; Ng-Ran; Architecture description (Release 15), 3GPP TS 38.401 V15.4.0 (Dec. 2018), Jan. 8, 2019, section 8.5; and figure 8.5-1.
(Continued)

*Primary Examiner* — Jung H Park
(74) *Attorney, Agent, or Firm* — Jefferson IP Law, LLP

(57) ABSTRACT

A method for supporting non-public network (NPN), by a first central unit (CU) of a first base station, in a wireless communication system, the method comprising: receiving, from a first distributed unit (DU) of the first base station, an F1 setup request comprising at least one of a first closed access network (CAG) identifier list or a first network identifier (NID) list, transmitting, to an access and mobility management function (AMF), an NG setup request comprising at least one of the first CAG identifier list or the first NID list, receiving, from the AMF, an NG setup response, and transmitting, to the first DU, an F1 setup response.

8 Claims, 23 Drawing Sheets

(51) Int. Cl.
   *H04W 48/02* (2009.01)
   *H04W 48/16* (2009.01)
   *H04W 76/19* (2018.01)
   *H04W 84/10* (2009.01)

(52) U.S. Cl.
   CPC ........... *H04W 48/16* (2013.01); *H04W 76/19* (2018.02); *H04W 36/087* (2023.05); *H04W 84/105* (2013.01)

(58) Field of Classification Search
   CPC . H04W 84/105; H04W 24/02; H04W 88/085; H04W 76/12; H04W 76/27; H04W 76/11; H04W 36/0011; H04W 36/0061; H04W 36/0069; H04W 92/20
   See application file for complete search history.

(56) References Cited

U.S. PATENT DOCUMENTS

| | | | |
|---|---|---|---|
| 2012/0122460 A1 | 5/2012 | Dalsgaard et al. | |
| 2012/0207128 A1 | 8/2012 | Wang | |
| 2020/0314701 A1* | 10/2020 | Talebi Fard | H04W 36/0016 |
| 2020/0314732 A1* | 10/2020 | Park | H04L 5/0055 |
| 2022/0124579 A1* | 4/2022 | Han | H04W 36/0058 |
| 2022/0132626 A1* | 4/2022 | Xu | H04W 76/11 |

FOREIGN PATENT DOCUMENTS

| | | |
|---|---|---|
| IN | 201617026090 A | 8/2016 |
| WO | 2016/188360 A1 | 12/2016 |
| WO | 2018/009340 A1 | 1/2018 |

OTHER PUBLICATIONS

ZTE, Consideration on support CAG in NR, R3-190262, 3GPP TSG-RAN WG3 #103, Feb. 15, 2019, Athens, Greece, sections 1-2; and figures 1, 3.

Ericsson, Commonalities in solutions for Non-Public Network deployments, R2-1903497, 3GPP TSG-RAN WG2 #105-Bis, Mar. 28, 2019, Xi'an, China, sections 2.3.2-2.4.

China Telecom, On CAG support for NR, R3-190244, 3GPP TSG RAN WG3#103, Feb. 16, 2019, Athens, Greece, sections 2-3.

Ericsson et al., Introducing support for Non-Public Networks, S2-1901110, 3GPP TSG-SA WG2 Meeting #130, Jan. 25, 2019, Kochi, India.

OPPO, Introducing support for Non-Public Networks and operations on Allowed CAG list, S2-1901613, 3GPP TSG-SA WG2 Meeting #131, Feb. 18, 2019, Tenerife (Spain).

European Search Report dated Mar. 1, 2022, issued in European Application No. 20782357.6.

Notice of Allowance dated Sep. 29, 2023, issued in European Application No. 20782357.6—1215.

Jinying Lin, Initial Analysis of LTE Small Cell Backhaul Carrying Scheme, LTE Small Cell, 2017.

Notice of Allowance dated Jan. 2, 2024, issued in Chinese Application No. 201910253354.X.

* cited by examiner

METHOD FOR SUPPORTING ACCESS TO CLOSED NETWORK, UE, BASE STATION AND READABLE STORAGE MEDIUM

TECHNICAL FIELD

This application relates to a field of wireless communication technology, and in particularly, to a method for supporting access to a closed network, a UE, a base station, and a computer-readable storage medium.

BACKGROUND ART

A fifth-generation (5G) mobile communication technology is not a single wireless technology, but a converging of existing wireless communication technologies. Currently, the peak rate of LTE can reach 100 Mbps, and the peak rate of 5G will reach 10 Gbps, which is 100 times faster than 4G. The existing 4G network has limited processing capacity and cannot support some traffic such as high-definition video, high-quality voice, augmented reality, and virtual reality and the like. 5G will meet requirements of mobile traffic growth, solve problems faced by 4G network through introducing more advanced technologies together with higher spectrum efficiency, more spectrum resources and denser cells to build a network community with high transmission rate, high capacity, low delay, high reliability and excellent user experience. As shown in FIG. 1, the 5G architecture includes a 5G access network and a 5G core network. The UE communicates with the data network through the access network and the core network.

The 5G access network includes a 5G base station gNB, and an LTE base station eNB connected to the 5G core network, which are collectively referred to as NG-RAN. Protocol stack on the base station is as shown in FIG. 2, and user plane of the base station includes service data adaptation protocol (SDAP), packet data convergence protocol (PDCP), radio link control protocol (RLC), media access control protocol (MAC) and physical layer, and control plane of the base station includes radio connection control protocol (RRC), PDCP, RLC, MAC, and the physical layer. The control plane also needs to support the interface protocol Xn between the base stations, and the protocol NG between the base station and the core network.

5G supports services with higher traffic rates and stricter delay requirements, such as Ultra-Reliable and Low Latency Communications. To support reliable low-latency services, shorter transmission time interval is introduced so as to support low-latency, and data replication transmission mechanism is introduced so as to support reliability. In the 5G architecture, with the development of wireless technology, function modules that were originally on the same base station are separated, some function modules are getting closer to users, and other modules are pooled, virtualized, and centrally deployed. That is, the base station may be divided into two parts, one is central control unit (CU), and the other is distribution unit (DU). The DU is closer to the user, the CU is far away from the antenna, and they can support multi-antenna connection and improve the network performance, one CU can connect multiple DUs, and the functions on the CU can be virtualized. The CU and the DU are connected through an F1 interface which is also called as a fronthaul interface or a fronthaul connection. The functions of RRC and PDCP are implemented on CU, and the functions of RLC, MAC and physical layer are implemented on DU.

In the 5G architecture, which is divided into CU and DU, it needs to consider how to support a closed access group (CAG) at the base station where the cell is located, or how to support standalone non-public network technology. Specifically, it needs to consider:

(1) when the UE accesses to the network, especially through architecture with the separated CU and DU, how to ensure that users belonging to CAG or non-public network can access to cells of the corresponding closed access group or non-public network, and prevent users not belonging to CAG accessing to cells that support the CAG, and prevent users not belonging to non-public network accessing to the non-public network.

(2) when the UE performs handover including the handover of NG and Xn, especially when the handover is performed under the architecture with the separated CU and DU, how to ensure that users belonging to CAG or non-public network can switch to cells of the corresponding closed access group or non-public network, and prevent users not belonging to CAG switching to cells that support the CAG, and prevent users not belonging to non-public network switching to the non-public network.

(3) when the UE performs RRC reestablishment in a new cell or the UE that is in inactive mode recovers RRC connection in a new cell, how to ensure that the UE can only reestablish in cells of the corresponding closed access group or non-public network, and prevent users not belonging to CAG reestablishing in cells that support the CAG, and prevent users not belonging to non-public network reestablishing in the non-public network.

DISCLOSURE OF INVENTION

Solution to Problem

In view of the disadvantages of the existing implementations, this application proposes a method for supporting access to a closed network, a UE, a base station, and a computer-readable storage medium, to solve the problem of how to enable users of a closed access group (CAG) or users belonging to a standalone non-public network (SNPN) to access the corresponding CAG cell or SNPN cell.

BRIEF DESCRIPTION OF DRAWINGS

In order to explain the technical solutions in the embodiments of the present application more clearly, the drawings used in the description of the embodiments of the present application will be briefly illustrated below.

MODE FOR THE INVENTION

Figure 1:
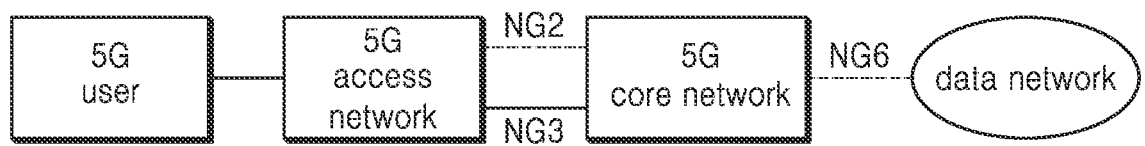
FIG. 1 is a diagram of 5G system architecture.
Figure 2:
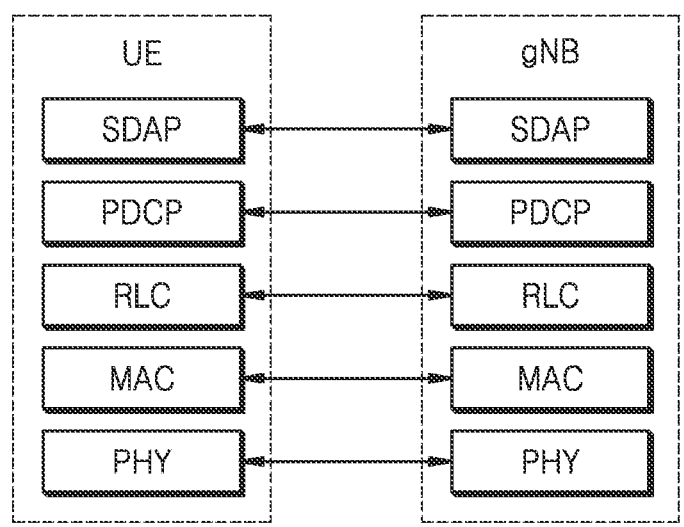
FIG. 2 is a diagram of the base station protocol architecture.
Figure 2:
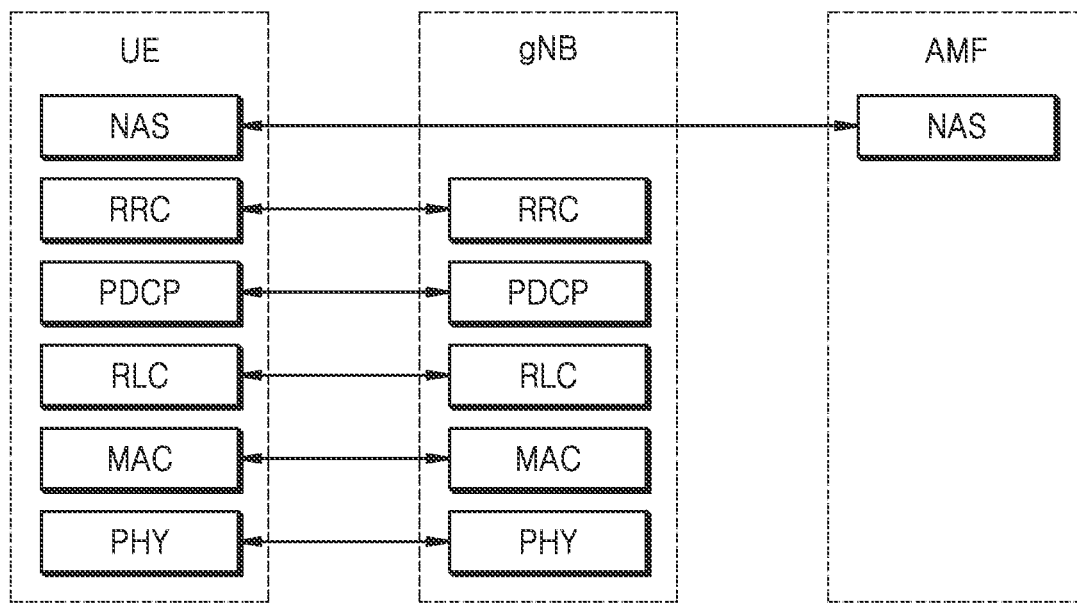

According to a first aspect of the disclosure, a method, used in a first base station, for supporting access to a closed network, including:
    receiving a radio resource control (RRC) reestablishment request transmitted by a user equipment (UE);
    transmitting a Retrieve UE Context request to a second base station based on the RRC reestablishment request;
    receiving a Retrieve UE Context response message transmitted by the second base station, wherein the Retrieve UE Context response message is determined by the second base station based on a first decision rule; and
    transmitting an RRC reestablishment response message to the UE to support the UE for accessing to the closed network based on the Retrieve UE Context response message, wherein the closed network includes at least one of a closed access group (CAG) and a standalone non-public network (SNPN).

According to a second aspect of the disclosure, a method, used in a second base station, for supporting access to a closed network, including:
    receiving a Retrieve UE Context request transmitted by a first base station;
    transmitting a Retrieve UE Context response message to the first base station, wherein the Retrieve UE Context response message is determined based on a first decision rule to support the UE for accessing to the closed network, wherein the closed network includes at least one of a closed access group (CAG) and a standalone non-public network (SNPN).

According to a third aspect of the disclosure, a method, used in a UE, for supporting access to a closed network, including:
    transmitting an RRC reestablishment request to a first base station;
    receiving an RRC reestablishment response message transmitted by the first base station; and
    accessing to the closed network, wherein the closed network includes at least one of a closed access group (CAG) and a standalone non-public network (SNPN).

According to a fourth aspect of the disclosure, a method, used in a first central control unit (CU), for supporting access to a closed network, including:
    receiving an F1 establishment request transmitted by a distribution unit (DU), wherein the F1 establishment request includes at least one of a closed access group (CAG) identifiers list and a standalone non-public network (SNPN) identifier;
    transmitting an NG establishment request to an access and mobility management function (AMF) of a core network, wherein the NG establishment request includes at least one of a CAG identifiers list and/or a SNPN identifier;
    receiving an NG establishment response transmitted by the AMF;
    transmitting an F1 establishment response to the DU;
    transmitting an Xn establishment request to a second CU, wherein the Xn establishment request includes at least one of a CAG identifiers list and/or a SNPN identifier to support UE for accessing to the closed network, wherein the closed network includes at least one of CAG and SNPN; and
    receiving an Xn establishment response transmitted by the second CU, wherein the Xn establishment response includes at least one of a CAG identifiers list and/or a SNPN identifier to support the UE for accessing to the closed network, wherein the closed network includes at least one of the CAG and the SNPN.

According to a fifth aspect of the disclosure, a method, used in a control unit (CU), for supporting access to a closed network, including:
    receiving an initial uplink (UL) RRC Message Transfer transmitted by a DU;
    transmitting a downlink (DL) RRC Message Transfer to the DU;
    receiving an UL RRC Message Transfer transmitted by the DU;
    transmitting an initial UE message to an AMF, wherein the initial UE message includes at least one of a cell global unique identifier of a cell at which the UE is located, a CAG identifiers list supported by the cell, a PLMN identifier, and a NID;

receiving an initial context establishment request message transmitted by the AMF;

transmitting a UE context establishment request message to the DU, wherein the UE context establishment request message includes at least one of the CAG identifiers list in which the UE is allowed to access and indication information for indicating whether the UE is only allowed to access CAG cell;

receiving a UE context establishment response transmitted by the DU; and transmitting an initial context establishment response message to the AMF to support the UE for accessing to a closed network, wherein the closed network includes at least one of CAG and SNPN.

According to a sixth aspect of the disclosure, a method, used in a destination base station, for supporting access to a closed network, including:

receiving a handover request message transmitted by a source base station, wherein the handover request message includes at least one of information of a destination base station, information of a destination cell, a CAG identifiers list in which the UE is allowed to access and indication information for indicating whether the UE is only allowed to access the CAG cell;

transmitting a handover response message to the source base station;

receiving a handover completion message for the UE switching from the source base station to the destination base station;

transmitting a path switch request message to the AMF, wherein the path switch request message includes at least one of a CAG identifiers list for a cell, a PLMN identifier for a cell, and a NID; and receiving a path switch response message transmitted by the AMF, wherein the path switch response message includes at least one of a CAG identifiers list in which the UE is allowed to access and indication information for indicating whether the UE is only allowed to access the CAG cell, to support the UE for accessing to the closed network, wherein the closed network includes at least one of CAG and SNPN.

According to a seventh aspect of the disclosure, a method, used in a primary base station, for supporting access to a closed network, including:

transmitting a secondary base station establishment request message to a secondary base station, wherein the secondary base station establishment request message includes at least one of a CAG identifiers list in which the UE is allowed to access and indication information for indicating whether the UE is only allowed to access the CAG cell; and receiving a secondary base station establishment response message transmitted by the secondary base station to support the UE for accessing to the closed network, wherein the closed network includes at least one of CAG and SNPN.

According to an eighth aspect of the disclosure, a first base station is provided, including: a first processing module, configured to receive a radio resource control (RRC) reestablishment request transmitted by a user equipment (UE);

a second processing module, configured to transmit a Retrieve UE Context request to a second base station based on the RRC reestablishment request;

a third processing module, configured to receive a Retrieve UE Context response message transmitted by the second base station, wherein the Retrieve UE Context response message is determined by the second base station based on a first decision rule; and a fourth processing module, configured to transmit an RRC reestablishment response message to the UE to support the UE for accessing to a closed network based on the Retrieve UE Context response message, wherein the closed network includes at least one of a closed access group (CAG) and a standalone non-public network (SNPN).

According to a ninth aspect of the disclosure, a second base station is provided, including: a receiving request module, configured to receive a Retrieve UE Context request transmitted by a first base station; and a message transmitting module, configured to transmit a Retrieve UE Context response message to the first base station, the Retrieve UE Context response message is determined based on a first decision rule to support the UE for accessing to a closed network, wherein the closed network includes at least one of a closed access group (CAG) and a standalone non-public network (SNPN).

According to a tenth aspect of the disclosure, a UE is provided, including:

a fifth processing module, configured to transmit an RRC reestablishment request to a first base station;

a sixth processing module, configured to receive an RRC reestablishment response message transmitted by the first base station; and an access processing module, configured to access to a closed network, wherein the closed network includes at least one of a closed access group (CAG) and a standalone non-public network (SNPN).

According to an eleventh aspect of the disclosure, a first CU is provided, including:

a seventh processing module, configured to receive an F1 establishment request transmitted by a distribution unit (DU), wherein the F1 establishment request includes at least one of a closed access group (CAG) identifiers list and a standalone non-public network (SNPN) identifier;

an eighth processing module, configured to transmit an NG establishment request to an access and mobility management function (AMF) of a core network, wherein the NG establishment request includes at least one of a CAG identifiers list and/or a SNPN identifier;

a ninth processing module, configured to receive an NG establishment response transmitted by the AMF;

a tenth processing module, configured to transmit transmitting an F1 establishment response to the DU;

an eleventh processing module, configured to transmit an Xn establishment request to a second CU, wherein the Xn establishment request includes at least one of a CAG identifiers list and/or a SNPN identifier to support UE for accessing to a closed network, wherein the closed network includes at least one of CAG and SNPN; and a twelfth processing module, configured to receive an Xn establishment response transmitted by the second CU, wherein the Xn establishment response comprises at least one of a CAG identifiers list and/or a SNPN identifier to support UE for accessing to the closed network, wherein the closed network comprises at least one of the CAG and the SNPN.

According to a twelfth aspect of the disclosure, a CU is provided, including:

a receiving processing module, configured to receive an initial UL RRC Message Transfer transmitted by a DU;

a thirteenth processing module, configured to transmit a DL RRC Message Transfer to the DU;

a fourteenth processing module, configured to receive an UL RRC Message Transfer transmitted by the DU;

a fifteenth processing module, configured to transmit an initial UE message to an AMF, wherein the initial UE message comprises at least one of global unique identifier of the cell at which the UE is located, a CAG identifiers list supported by the cell, a PLMN identifier, and a NID;

a sixteenth processing module, configured to receive an initial context establishment request message transmitted by the AMF;

a seventeenth processing module, configured to transmit a UE context establishment request message to the DU, wherein the UE context establishment request message includes at least one of a CAG identifiers list in which the UE is allowed to access and indication information for indicating whether the UE is only allowed to access the CAG cell;

an eighteenth processing module, configured to receive a UE context establishment response transmitted by the DU; and a nineteenth processing module, configured to transmit an initial context establishment response message to the AMF to support the UE for accessing to a closed network, wherein the closed network includes at least one of CAG and SNPN.

According to a thirteenth aspect of the disclosure, a destination base station is provided, including:

a twentieth processing module, configured to receive a handover request message transmitted by a source base station, wherein the handover request message includes at least one of information of a destination base station, information of a destination cell, a CAG identifiers list in which the UE is allowed to access and indication information for indicating whether the UE is only allowed to access the CAG cell;

a twenty-first processing module, configured to transmit a handover response message to the source base station;

a twenty-second processing module, configured to receive a handover completion message for the UE switching from the source base station to the destination base station;

a twenty-third processing module, configured to transmit a path switch request message to the AMF, wherein the path switch request message includes at least one of a CAG identifiers list for a cell, a PLMN identifier for a cell, and a NID; and a twenty-fourth processing module, configured to receive a path switch response message transmitted by the AMF, wherein the path switch response message includes at least one of a CAG identifiers list in which the UE is allowed to access and indication information for indicating whether the UE is only allowed to access the CAG cell, to support the UE for accessing to a closed network, wherein the closed network includes at least one of CAG and SNPN.

According to a fourteenth aspect of the disclosure, a primary base station is provided, including:

a twenty-fifth processing module, configured to transmit a secondary base station establishment request message to a secondary base station, wherein the secondary base station establishment request message includes at least one of a CAG identifiers list in which the UE is allowed to access and indication information for indicating whether the UE is only allowed to access the CAG cell; and a twenty-sixth processing module, configured to receive a secondary base station establishment response message transmitted by the secondary base station to support the UE for accessing to a closed network, wherein the closed network includes at least one of CAG and SNPN.

According to a fifteenth aspect, the present application provides computer-readable storage medium storing a computer program that, when executed by a processor, implement the method for supporting access to a closed network according to the first to sixth aspect of the application.

The technical solutions provided in the embodiments of the present application have at least the following advantages: enabling users of a closed access group (CAG) or users belonging to a standalone non-public network (SNPN) to access the corresponding CAG cell or SNPN cell.

Additional aspects and advantages of the present application will be given in the following description, which will become apparent from the following description or be known through the practice of the present application.

The embodiments of the present application are described in detail below, and the examples of the embodiments are illustrated in the drawings, wherein throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

The embodiments of the present application will be described in detail below in conjunction with the accompanying drawings in order to make the objects, technical solutions and advantages of the present disclosure more clear.

Embodiment 1

Figure 3A:
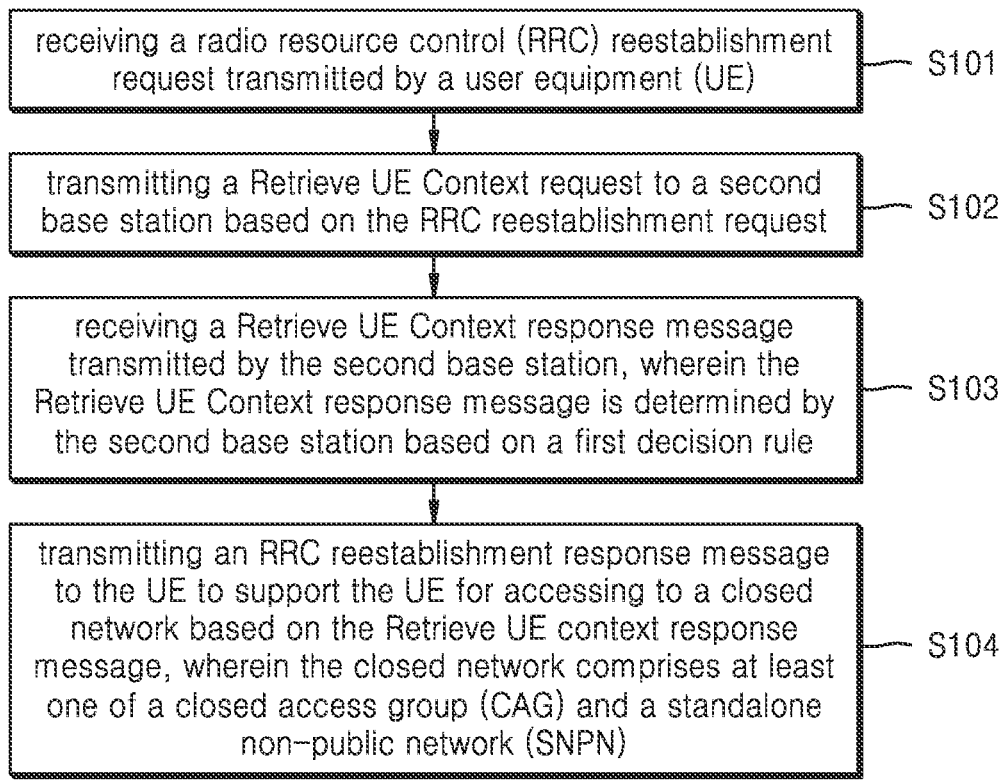
FIG. 3a is a schematic flowchart of a method for supporting access to a closed network according to an embodiment of the present application.

An embodiment of the present application provides a method, used in a first base station, for supporting access to a closed network, and the schematic flowchart of the method is shown in FIG. 3a. The method includes the following steps:

Step S101: receiving a radio resource control (RRC) reestablishment request transmitted by a user equipment (UE).

Step S102: transmitting a Retrieve UE Context request to a second base station based on the RRC reestablishment request;

Step S103: receiving a Retrieve UE Context response message transmitted by the second base station, wherein the Retrieve UE Context response message is determined by the second base station based on a first decision rule.

Step S104: transmitting an RRC reestablishment response message to the UE to support the UE for accessing to the closed network based on the Retrieve UE Context response message, wherein the closed network includes at least one of a closed access group (CAG) and a standalone non-public network (SNPN).

In the embodiment of the present application, the first base station receives a radio resource control (RRC) reestablishment request transmitted by a user equipment (UE); the first base station transmits a Retrieve UE Context request to a second base station based on the RRC reestablishment request; the first base station receives a Retrieve UE Context response message transmitted by the second base station, wherein the Retrieve UE Context response message is determined by the second base station based on a first decision rule; the first base station transmits an RRC reestablishment response message to the UE to support the UE for accessing to the closed network based on the Retrieve UE Context response message, wherein the closed network includes at least one of a closed access group (CAG) and a standalone non-public network (SNPN). In this way, it enables users of a closed access group (CAG) or users belonging to a standalone non-public network (SNPN) to access the corresponding CAG cell or SNPN cell.

Alternatively, the first decision rule includes at least one of the following:
the second base station determines whether the CAG supported by a cell of the first base station is in a CAG identifiers list allowed by the UE, and if it is, the second base station transmits a Retrieve UE Context response message to the first base station, and if not, the second base station transmits a Retrieve UE Context failure message to the first base station;
the second base station determines whether a SNPN identifier for the cell of the first base station is the same as a SNPN identifier for a cell of the second base station, and if it is, the second base station transmits the Retrieve UE Context response message to the first base station, if not, the second base station transmits a Retrieve UE Context failure message to the first base station.

Alternatively, a Retrieve UE Context request is transmitted to the second base station, and the message carries identifiers of CAG or identifiers of SNPN supported by the cell of the first base station; the Retrieve UE Context failure message transmitted by the second base station is received, and the UE is prevented from accessing to the closed network including at least one of CAG and SNPN, and the message carries the reason for failure.

Figure 3B:
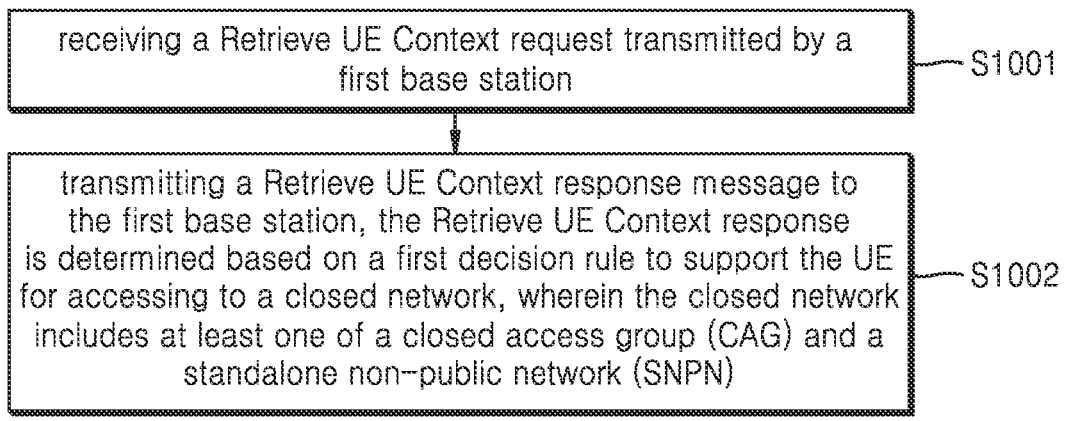
FIG. 3b is a schematic flowchart of another method for supporting access to a closed network according to an embodiment of the present application.

An embodiment of the present application provides a method, used in a second base station, for supporting access to a closed network, and the schematic flowchart of the method is shown in FIG. 3*b*. The method includes the following steps:

Step S1001: receiving a Retrieve UE Context request transmitted by a first base station.

Step S1002: transmitting a Retrieve UE Context response message to the first base station, wherein the Retrieve UE Context response message is determined based on a first decision rule to support the UE for accessing to the closed network, wherein the closed network includes at least one of a closed access group (CAG) and a standalone non-public network (SNPN).

Alternatively, the first decision rule includes at least one of the following:
the second base station determines whether the CAG supported by a cell of the first base station is in a CAG identifiers list allowed by the UE, and if it is, the second base station transmits a Retrieve UE Context response message to the first base station, and if not, the second base station transmits a Retrieve UE Context failure message to the first base station;
the second base station determines whether a SNPN identifier for the cell of the first base station is the same as a SNPN identifier for a cell of the second base station, and if it is, the second base station transmits the Retrieve UE Context response message to the first base station, if not, the second base station transmits a Retrieve UE Context failure message to the first base station.

Figure 4:
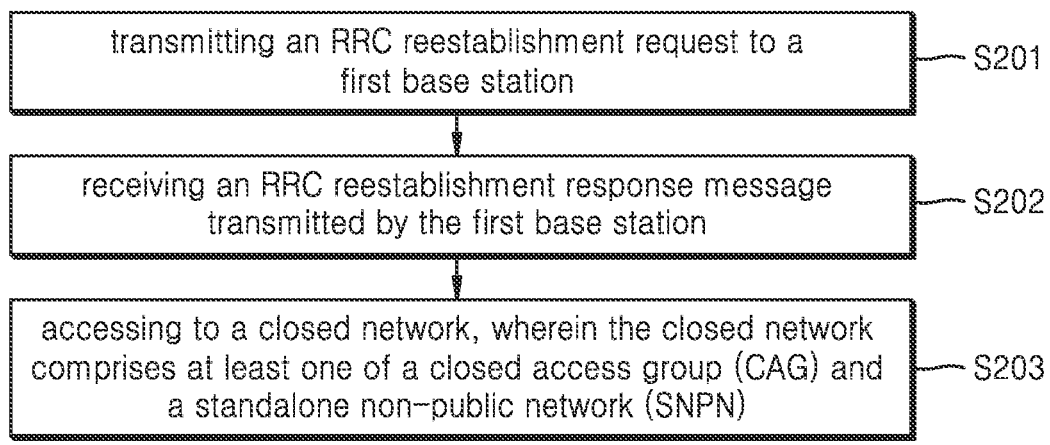
FIG. 4 is a schematic flowchart of another method for supporting access to a closed network according to an embodiment of the present application.

An embodiment of the present application provides another method, used in a UE, for supporting access to a closed network, and the schematic flowchart of the method is shown in FIG. 4. The method includes the following steps:

Step S201: transmitting an RRC reestablishment request to a first base station.

Step S202: receiving an RRC reestablishment response message transmitted by the first base station.

Step S203: accessing to the closed network, wherein the closed network comprises at least one of a closed access group (CAG) and a standalone non-public network (SNPN).

Figure 5:
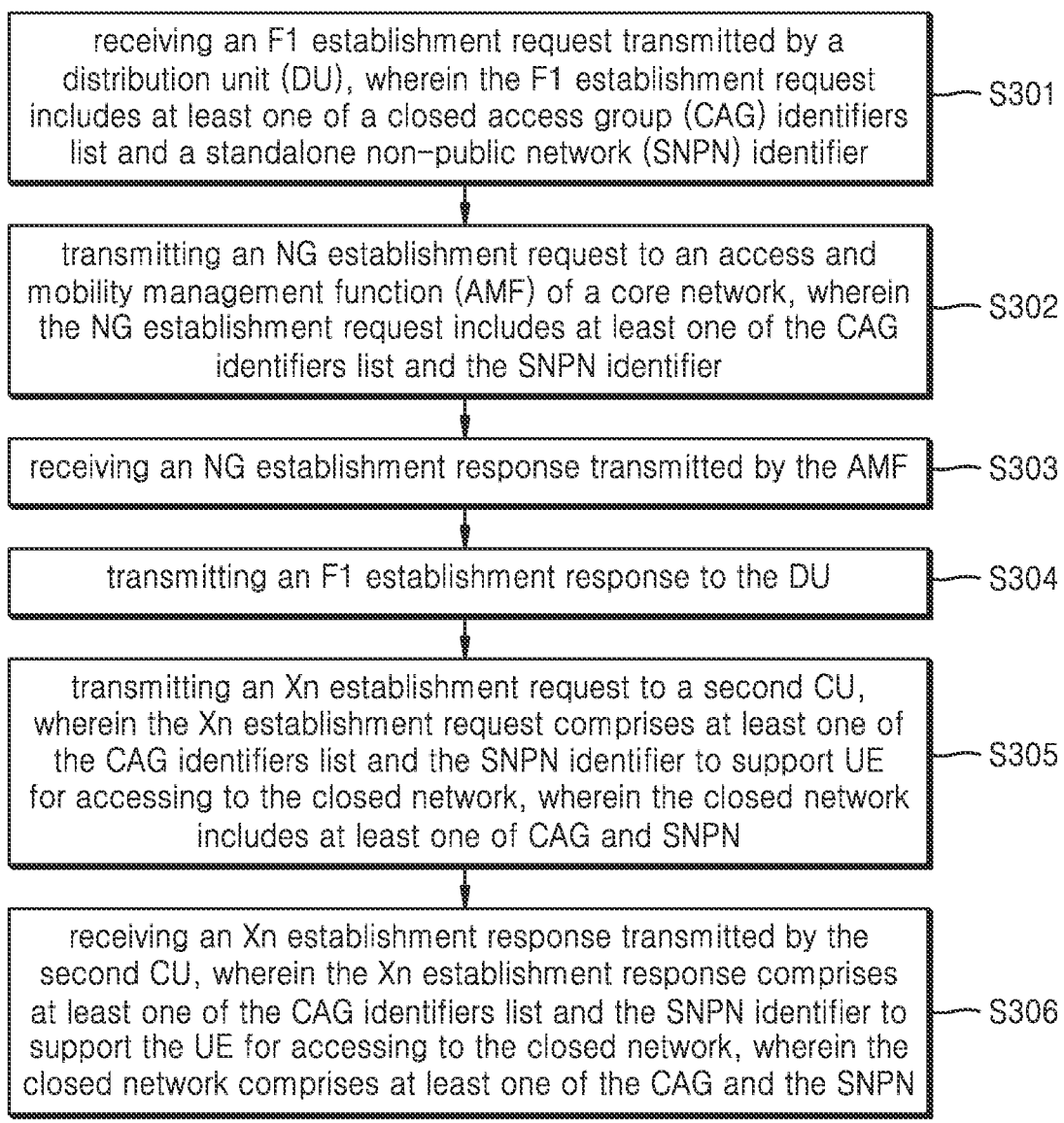
FIG. 5 is a schematic flowchart of yet another method for supporting access to a closed network according to an embodiment of the present application.

An embodiment of the present application provides yet another method, used in a first central control unit (CU), for supporting access to a closed network, and the schematic flowchart of the method is shown in FIG. 5. The method includes the following steps:

Step S301: receiving an F1 establishment request transmitted by a distribution unit (DU), wherein the F1 establishment request includes at least one of a closed access group (CAG) identifiers list and/or a standalone non-public network (SNPN) identifier.

Step S302: transmitting an NG establishment request to an access and mobility management function (AMF) of a core network, wherein the NG establishment request includes at least one of a CAG identifiers list and/or a SNPN identifier.

Step S303: receiving an NG establishment response transmitted by the AMF.

Step S304: transmitting an F1 establishment response to the DU.

Step S305: transmitting an Xn establishment request to a second CU, wherein the Xn establishment request comprises at least one of a CAG identifiers list and/or a SNPN identifier to support UE for accessing to the closed network, wherein the closed network comprises at least one of CAG and SNPN.

Step S306: receiving an Xn establishment response transmitted by the second CU, wherein the Xn establishment response comprises at least one of a CAG identifiers list and/or a SNPN identifier to support the UE for accessing to the closed network, wherein the closed network comprises at least one of the CAG and the SNPN.

Alternatively, when the F1 establishment request includes the CAG identifiers list, information carried by the NG establishment request comprises at least one of the following:

an identifier of a base station, a routing area of the base station, an operator identifier of the base station, a CAG identifiers list supported by the base station, and information about cells supported by the base station, wherein the information about cells supported by the base station comprises a cell identity, a cell operator identifier, a cell routing area identifier, and a CAG identifiers list supported by the cell.

Alternatively, when the F1 establishment request includes the SNPN identifier, information carried by the NG establishment request comprises at least one of the following:

a public land mobile network (PLMN) identifier, and a network identifier (NID).

Figure 6:
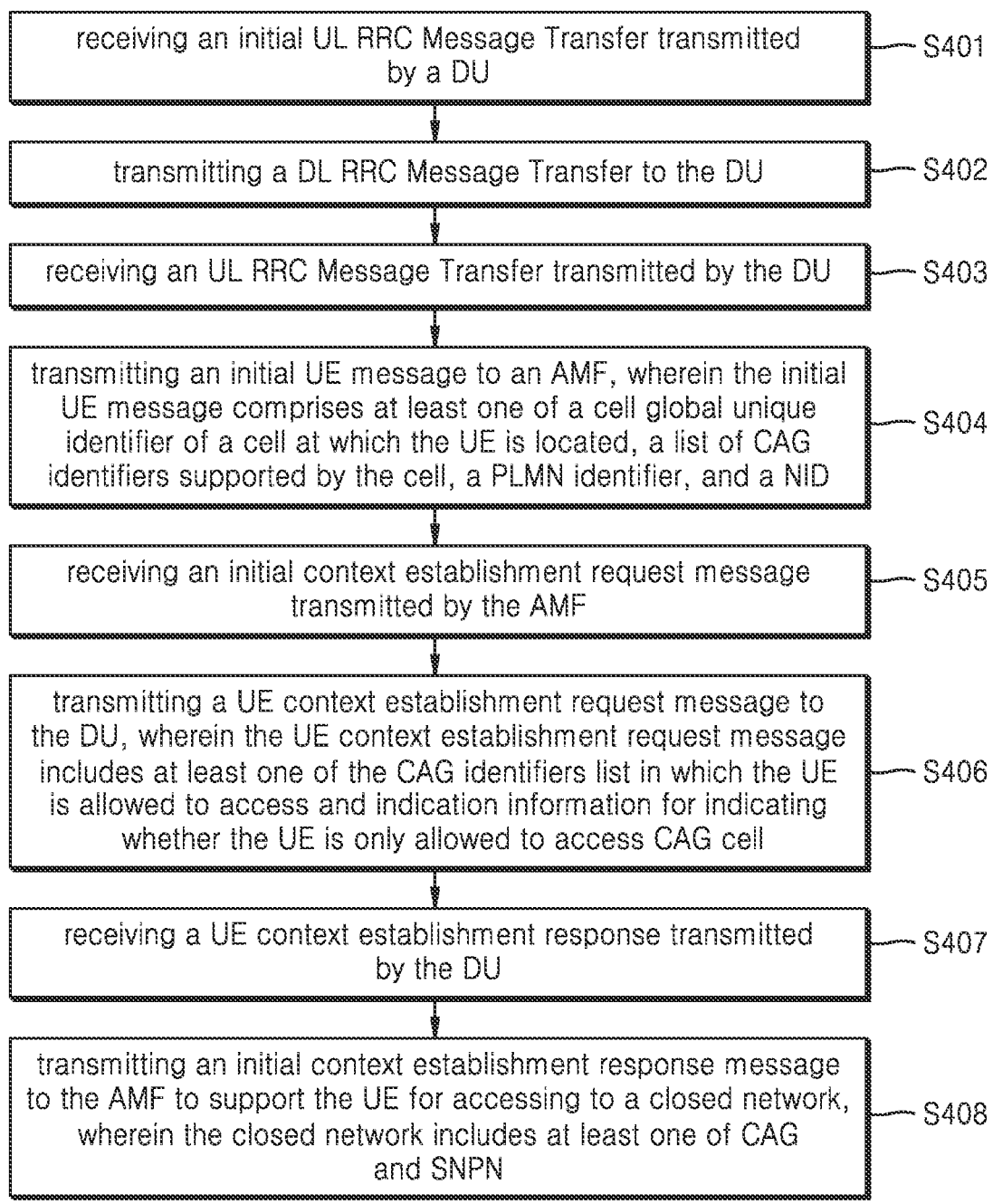
FIG. 6 is a schematic flowchart of yet another method for supporting access to a closed network according to an embodiment of the present application.

An embodiment of the present application provides yet another method, used in a CU, for supporting access to a closed network, and the schematic flowchart of the method is shown in FIG. 6. The method includes the following steps:

Step S401: receiving an Initial UL RRC Message Transfer transmitted by a DU.

Step S402: transmitting a DLRRC Message Transfer to the DU.

Step S403: receiving an UL RRC Message Transfer transmitted by the DU.

Step S404: transmitting an initial UE message to an AMF, wherein the initial UE message comprises at least one of a cell global unique identifier of a cell at which the UE is located, a list of CAG identifiers supported by the cell, a PLMN identifier, and a NID.

Step S405: receiving an initial context establishment request message transmitted by the AMF.

Step S406: transmitting a UE context establishment request message to the DU, wherein the UE context establishment request message includes at least one of the CAG identifiers list in which the UE is allowed to access and indication information for indicating whether the UE is only allowed to access CAG cell.

Step S407: receiving a UE context establishment response transmitted by the DU.

Step S408: transmitting an initial context establishment response message to the AMF to support the UE for accessing to the closed network, wherein the closed network includes at least one of CAG and SNPN.

Alternatively, the Initial UL RRC Message Transfer message includes at least one of the following:

an identifier on F1 allocated by the DU to the UE;
a cell global identifier (CGI) of the cell accessed by the UE;
if the cell accessed by the UE supports the CAG, the initial UL RRC Message Transfer further carries the CAG identifiers list supported by the cell;
if the cell accessed by the UE belongs to the SNPN, the initial UL RRC Message Transfer further carries the PLMN identifier and the NID;
a cell-radio network temporary identifier (C-RNTI) allocated by the DU to the UE, the C-RNTI is a unique identifier used to identify the RRC connection and scheduling of the UE;
RRC container from the DU to the CU, wherein the RRC container comprises cell group configuration information which includes information required to establish SRB1.

Alternatively, the initial context establishment request message includes at least one of the following:

an identifier of the NG interface allocated by the AMF to the UE, wireless capability of the UE, encryption capability of the UE, information related to the establishment of data session, a CAG identifiers list in which the UE is allowed to access and indication information for indicating whether the UE is only allowed to access the CAG cell.

Figure 7:
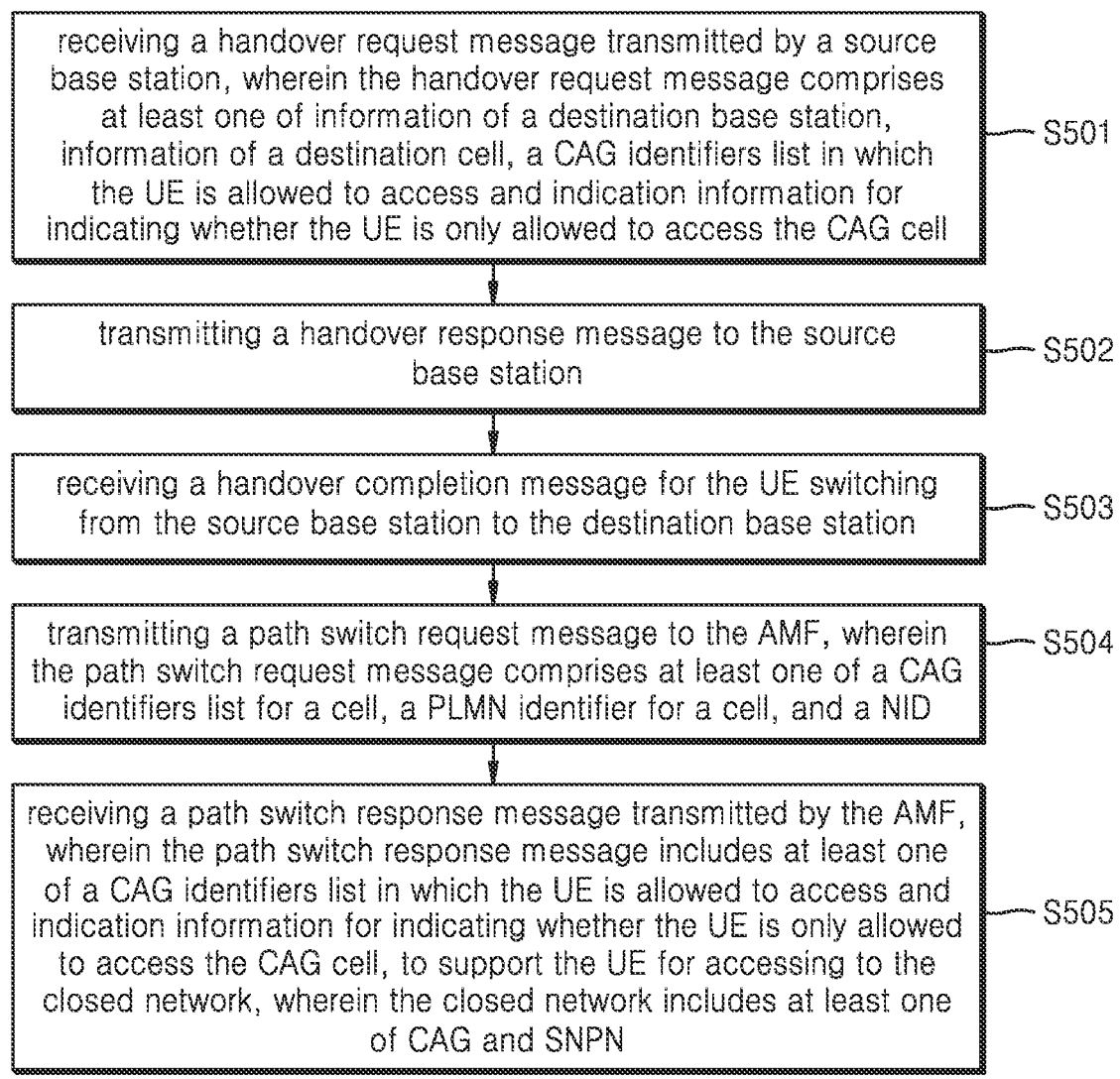
FIG. 7 is a schematic flowchart of yet another method for supporting access to a closed network according to an embodiment of the present application.

An embodiment of the present application provides yet another method, used in a destination base station, for supporting access to a closed network, and the schematic flowchart of the method is shown in FIG. 7. The method includes the following steps:

Step S501: receiving a handover request message transmitted by a source base station, wherein the handover request message comprises at least one of information of a destination base station, information of a destination cell, a CAG identifiers list in which the UE is allowed to access and indication information for indicating whether the UE is only allowed to access the CAG cell.

Step S502: transmitting a handover response message to the source base station.

Step S503: receiving a handover completion message for the UE switching from the source base station to the destination base station.

Step S504: transmitting a path switch request message to the AMF, wherein the path switch request message comprises at least one of a CAG identifiers list for a cell, a PLMN identifier for a cell, and a NID.

Step S505: receiving a path switch response message transmitted by the AMF, wherein the path switch response message includes at least one of a CAG identifiers list in which the UE is allowed to access and indication information for indicating whether the UE is only allowed to access the CAG cell, to support the UE for accessing to the closed network, wherein the closed network includes at least one of CAG and SNPN.

Figure 8:
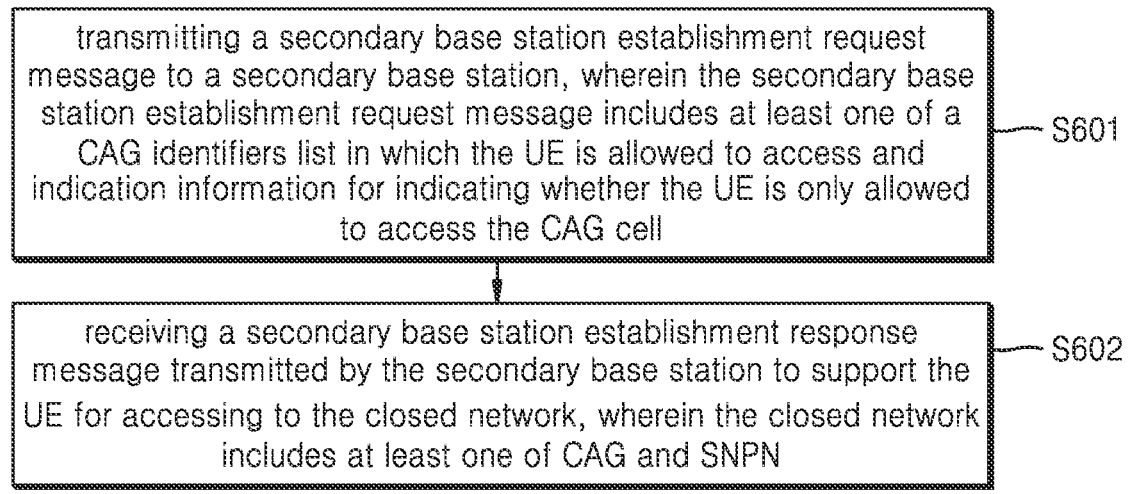
FIG. 8 is a schematic flowchart of yet another method for supporting access to a closed network according to an embodiment of the present application.

An embodiment of the present application provides another method, used in a primary base station, for supporting access to a closed network, and the schematic flowchart of the method is shown in FIG. 8. The method includes the following steps:

Step S601: transmitting a secondary base station establishment request message to a secondary base station, wherein the secondary base station establishment request message includes at least one of a CAG identifiers list in which the UE is allowed to access and indication information for indicating whether the UE is only allowed to access the CAG cell.

Step S602: receiving a secondary base station establishment response message transmitted by the secondary base station to support the UE for accessing to the closed network, wherein the closed network includes at least one of CAG and SNPN.

The technical solutions provided in the embodiments of the present application have at least the following advantages: enabling users of a closed access group (CAG) or users belonging to a standalone non-public network (SNPN) to access the corresponding CAG cell or SNPN cell.

Embodiment 2

A method for supporting access to a closed network according to the above embodiment 1 of the present application is described in detail in the following embodiments.

Figure 9:
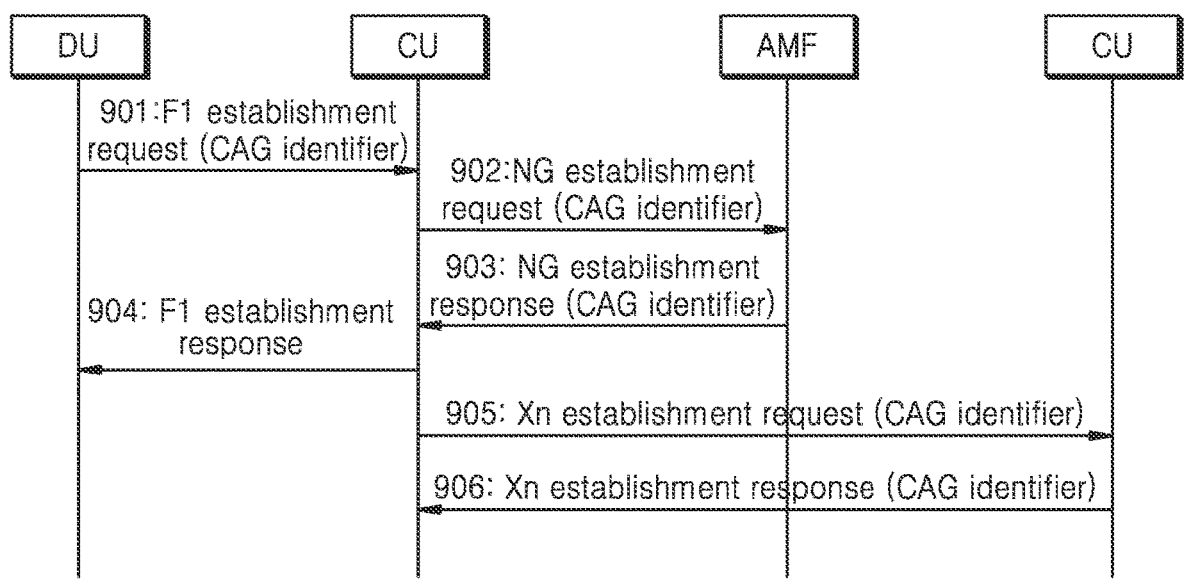
FIG. 9 is a schematic diagram of an interface establishment process provided by an embodiment of the present application.

FIG. 9 is a schematic diagram of an interface establishment process provided by an embodiment of the present application. The base station is separated into a base station centralized control unit (CU) and a base station distribution unit (DU), wherein one DU may be connected to multiple CUs, and one CU may be connected to multiple DUs. The base station may be a 5G base station, or an LTE base station, or a base station in another access mode. In this embodiment, a 5G base station is used as an example. If other systems are used, the corresponding interface and message names are changed accordingly. As shown in FIG. 9:

Step 901: the DU transmits an F1 establishment request message to the CU.

The F1 establishment request message includes a group of information about cells.

The information of these cells is configured on the DU by the OAM, and these cells are ready to be activated. The cell information includes physical cell identifier (PCI), including unique identifier of the cell, such as a cell global identifier (CGI), and the operator identifier of the cell (e.g., PLMN ID).

If the cell supports a closed access group (CAG), the cell information further includes a CAG identifier, wherein the CAG identifier indicates which CAG is supported by the cell. The CAG identifier is unique under PLMN, and one cell may support multiple CAGs, that is the information of one cell may include a CAG identifiers list. One CAG identifier may also have a corresponding readable network name, which is used to display to the user. The user may manually perform the CAG selection based on the readable network name.

The CU obtains the CAG identifier of the cell. When the UE accesses to the cell, it is determined whether to allow the UE to make access based on the CAG identifiers supported by the accessed cell and the CAG list in which the UE is allowed to access. Alternatively, when the UE makes handover, it is determined whether to allow the UE to make handover based on the CAG identifiers supported by the destination cell and the CAG list for allowing the UE to make access.

If the cell belongs to a standalone non-public network (SNPN), the cell information of the F1 establishment request message includes the PLMN identifier and the network identifier (NID). The PLMN identifier and NID are combined to identify an SNPN. The NID may be an identifier locally maintained, which is not a unique identifier across the entire network, or a unique identifier across the entire network. One PLMN ID may have multiple NIDs.

Step 902: The CU transmits an NG establishment request message to the AMF.

If no NG interface is established between the CU and the AMF, the CU transmits an NG establishment request message to the AMF. If an NG interface has been established between the CU and the AMF, the CU transmits a base station configuration update request to the AMF.

If the cell information received in step 901 includes the CAG identifier supported by the cell, the NG establishment request message carries the identifier of the base station, the routing area of the base station and operator identifiers of the base station, and the message further carries the CAG identifiers list supported by the base station, or the NG establishment request message further carries the information of cells supported by the base station. The information of the cells includes the cell identity, the operator identifier of the cell, the routing area identifier of the cell, and the CAG identifiers list supported by the cell.

If the cell belongs to a standalone non-public network (SNPN), the NG establishment request message includes the PLMN identifiers supported by the base station, and further includes a network identifier (NID). The PLMN identifier and the NID is combined to identify an SNPN, which is also referred to as the SNPN identifier. The NID may be an identifier locally maintained, which is not a unique identifier across the entire network, or a unique identifier across the entire network. One PLMN ID may have multiple NIDs. Alternatively, the NG establishment request message further carries the information of cells supported by the base station. The information of the cells includes the cell identity, the operator identifier of the cell, and the network identifier (NID).

Alternatively, the AMF obtains the CAG identifier of the base station. When the UE makes handover, for example, the NG handover, the AMF knows the handover destination base station or destination cell from the handover required message transmitted by the source base station. The AMF determines whether to allow the UE to switch to the destination base station based on the CAG identifiers supported by the destination base station obtained from the NG interface establishment request message and the stored CAG list for allowing the UE to make access. If none of the CAG identifiers supported by the destination base station is in the CAG list of allowing the UE to make access, the AMF determines that the UE is not allowed to access to the destination base station. The AMF may directly transmit a handover rejection to the source base station. The handover rejection message may indicate why the handover was rejected, for example, the reason for the rejection is that the destination base station/the destination cell is not allowed to be accessed.

Alternatively, the AMF obtains the CAG identifier of the cell. When the UE makes handover, for example, the NG handover, the AMF knows the handover destination cell from the handover required message transmitted by the source base station. The AMF determines whether to allow the UE to switch to the destination cell based on the CAG identifiers supported by the destination cell obtained from the NG interface establishment request message and the stored CAG list for allowing the UE to make access. If none of the CAG identifiers supported by the destination cell is in the CAG list for allowing the UE to make access, the AMF determines that the UE is not allowed to access to the destination cell. The AMF may directly transmit a handover rejection to the source base station. The handover rejection message may indicate why the handover was rejected, for example, the reason for the rejection is that the destination base station/the destination cell is not allowed to be accessed.

Alternatively, the AMF obtains the SNPN identifier of the base station. When the UE makes handover, for example, the NG handover, the AMF knows the handover destination base station or destination cell from the handover required message transmitted by the source base station. The AMF determines whether to allow the UE to switch to the destination base station based on the SNPN identifiers supported by the destination base station obtained from the NG interface establishment request message and the stored authentication information of the UE. If none of the SNPN identifiers supported by the destination base station is in the SNPN list of allowing the UE to make access, the AMF determines that the UE is not allowed to access to the destination base station. The AMF may directly transmit a handover rejection to the source base station. The handover rejection message may indicate why the handover was rejected, for example, the reason for the rejection is that the destination base station/the destination cell is not allowed to be accessed.

Alternatively, the AMF obtains the SNPN identifier of the cell. When the UE makes handover, for example, the NG handover, the AMF knows the handover destination cell from the handover required message transmitted by the source base station. The AMF determines whether to allow the UE to switch to the destination cell based on the SNPN identifiers supported by the destination cell obtained from the NG interface establishment request message and the stored authentication information of the UE. If none of the SNPN identifiers supported by the destination cell is in the SNPN list of allowing the UE to make access, the AMF determines that the UE is not allowed to access to the destination cell. The AMF may directly transmit a handover rejection to the source base station. The handover rejection message may indicate why the handover was rejected, for example, the reason for the rejection is that the destination base station/the destination cell is not allowed to be accessed.

Step 903: the AMF transmits a NG establishment response message to the CU.

Step 904: the CU transmits an F1 establishment response message to the DU.

Step 905: the CU (referred to as CU1 to distinguish from CU2) transmits an Xn establishment request message to another CU (CU2).

CU1 needs to establish an interface with a neighboring CU2. CU1 and CU2 are the CUs of the NG RAN node. If it is the CU of the LTE base station, the message transmitted in this step is an X2 establishment request message. The message carries the information about the serving cell on CU1. The cell information includes physical cell identifier (PCI), unique identifier of the cell, such as a cell global identifier (CGI), and the operator identifier of the cell (e.g., PLMN ID). If the cell supports closed access groups, the cell information further includes a CAG identifiers list. If the cell belongs to the SNPN, the cell information of the Xn establishment request message includes the PLMN identifier and the network identifier (NID).

Step 906: CU2 transmits an Xn establishment response message to CU1.

CU2 transmits an Xn interface establishment response message to CU1, and the message carries information about the serving cell on CU2. The cell information includes physical cell identifier (PCI), unique identifier of the cell, such as a cell global identifier (CGI), and the operator identifier of the cell (e.g., PLMN ID). If the cell supports closed access groups, the cell information further includes a CAG identifiers list. If the cell belongs to the SNPN, the cell information of the Xn establishment request message includes the PLMN identifier and the network identifier (NID).

Figure 10:
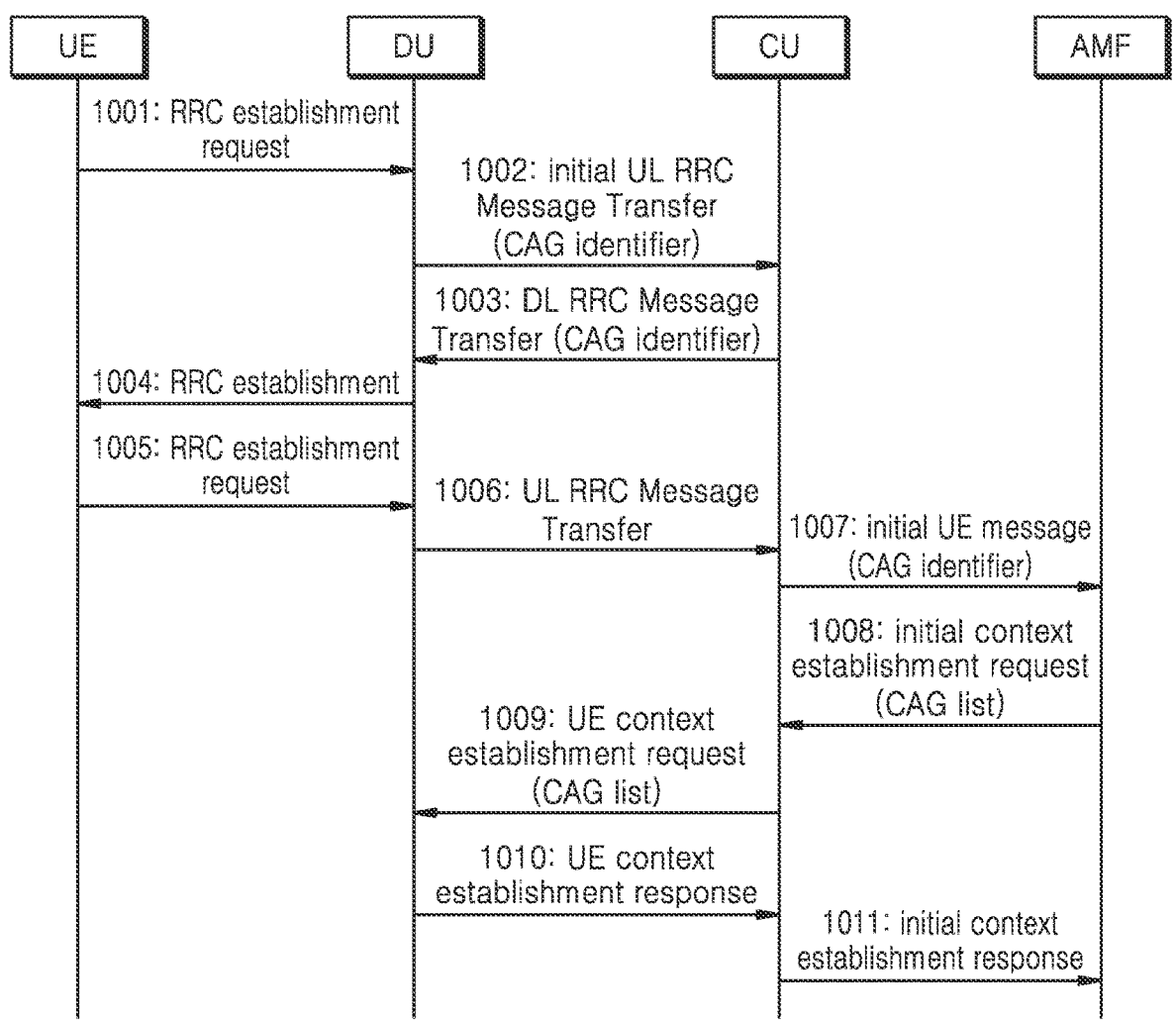
FIG. 10 is a schematic diagram of a process in which a UE accesses to a CAG cell according to an embodiment of the present application.

FIG. 10 is a schematic diagram of a process in which a UE accesses a CAG cell according to an embodiment of the present application. The base station is separated into a base station centralized control unit (CU) and a base station distribution unit (DU), wherein one DU may be connected to multiple CUs, and one CU may be connected to multiple DUs. The base station may be a 5G base station, or an LTE base station, or a base station in another access mode. In this embodiment, a 5G base station is used as an example. If other systems are used, the corresponding interface and message names are changed accordingly. As shown in FIG. 10:

Step 1001: the UE transmits an RRC establishment request message to the DU.

The UE initiates the establishment of an RRC connection, and transmits the RRC establishment request message to the DU. The message carries the UE's temporary identifier and the reason for the RRC establishment.

Step 1002: the DU transmits an initial UL RRC Message Transfer to the CU.

The DU transmits an "initial UL RRC message transfer" to the CU through the F1 interface. The message name may be another message name. The message carries the RRC connection request message transmitted by the UE through the RRC container. The message also carries one or more of the following information.

The message also carries the identifier on F1 allocated by the DU to the UE.

The message also carries the cell global unique identifier CGI of the cell accessed by the UE. If the cell accessed by the UE supports a closed access group, the message further carries a CAG identifiers list supported by the cell. If the cell accessed by the UE belongs to the SNPN, the message may further carry the PLMN identifier and the network identifier (NID).

The message also carries a cell-radio network temporary identifier (C-RNTI) allocated by the DU to the UE, the C-RNTI is a unique identifier used to identify the RRC connection and scheduling of the UE.

The message also carries an RRC container from DU to CU including cell group configuration information, wherein the cell group configuration information includes necessary information required to establish SRB1.

The message also carries the RRC container which contains the RRC message received by the DU from the UE.

Step 1003: the CU transmits a DL RRC Message Transfer to the DU.

The CU transmits a "DL RRC Message Transfer" to the DU through the F1 interface. The message name may be another message name. The message carries one or more of the following information.

The message carries the identifier on F1 allocated by the CU to the UE.

The message carries the signaling radio bearer (SRB) identifier. In this step, the SRB identifier is set to SRB1.

The message carries an RRC container, and the RRC container contains an RRC establishment message generated by the CU. The RRC establishment message carries the configuration information of SRB1. The RRC establishment message is transmitted to the UE through the DU.

Step 1004: the DU transmits a downlink RRC establishment message to the UE.

The DU transmits the RRC establishment message received in step 1003 to the UE.

Step 1005: the UE transmits an RRC establishment completion message to the DU.

The RRC connection establishment completion message carries an identifier of operator (such as PLMN ID) selected by the UE. The message also includes a non-access layer message. After receiving the message, the base station transmits the non-access layer message to the core network mobile function node AMF.

Step 1006: the DU transmits an UL RRC Message Transfer to the CU.

The UL RRC Message Transfer carries the RRC establishment completion message received by the DU. After receiving the message of step 1005, the DU transmits an "UL RRC Message Transfer" to the CU through the F1 interface, and the message name may be another message name.

Step 1007: the CU transmits an initial UE message to the AMF.

After the CU receives the message of step 1006, the CU transmits an "initial UE message" to the AMF through the NG interface. The message carries the non-access layer message transmitted by the UE in step 1005. The message also carries the location information of the UE, such as the unique identifier across the entire network of the cell where the UE is located. If the cell accessed by the UE supports a closed access group, the message also carries a CAG identifiers list supported by the cell. If the cell belongs to an SNPN, the initial UE message also includes the PLMN identifier and the network identifier (NID).

Step 1008: the AMF transmits an initial context establishment request message to the CU.

Alternatively, the AMF receives the message of step 1007, and knows the CAG identifier of the cell where the UE is located or obtains the identifier of CAG supported by the cell during the NG interface establishment process, the CAG list stored by the AMF for allowing the UE to make access. By combining the above information, the AMF determine whether to allow the UE to access the serving cell. If the identifier of CAG supported by the serving cell is not in the CAG list for allowing the UE to make access, or the serving cell does not support CAG cell and the UE only allows access to the CAG cell, the AMF determines that the UE is not allowed to access to the serving cell, and the AMF may directly transmit the UE context release request message to the base station. The message may indicate why the access was rejected, for example, the reason for the rejection is that the cell is not allowed to be accessed. If the access is allowed, the AMF transmits an initial context establishment request message to the CU.

Alternatively, the AMF receives the message of step 1007, and knows the SNPN identifier of the cell where the UE is located or obtains the SNPN identifier supported by the cell during the NG interface establishment process. The AMF stores the authentication information of the UE, and the authentication information indicates which SNPNs may be accessed by the UE. Based on above information, the AMF determine whether to allow the UE to access the serving cell. If the SNPN identifier supported by the serving cell is not in the SNPN identifier list for allowing the UE to make access, the AMF determines that the UE is not allowed to access to the serving cell, and the AMF may directly transmit the UE context release request message to the base station. The message may indicate why the access was rejected, for example, the reason for the rejection is that the access is not allowed. If the access is allowed, the AMF transmits an initial context establishment request message to the CU.

Alternatively, the AMF transmits an "initial context establishment request" message to the CU through the NG interface. The message name may be another name. The message includes the identifier of the NG interface allocated by the AMF for the UE, the wireless capability of the UE, the encryption capability, and the information about the data session (e.g., PDU session) establishment, such as the data session identifier, quality requirement and so on. The message also carries a list of CAGs for allowing UE to access, and the message may also carry indication information about whether the UE is only allowed to access the CAG cell.

Step 1009: the CU transmits a UE context establishment request message to the DU.

The context establishment request message carries the identifier on F1 of the UE, and bearer information or PDU session information to be established. It also carries a list of CAGs that allow the UE to access, and the message may also carry indication information about whether the UE is only allowed to access the CAG cell. The information is stored in the DU, and the DU may use the information as a basis for determining whether to allow the UE to access a certain cell. For example, when the UE is reestablished in a cell under the DU, if the DU has the context of the UE, the DU may determine whether the UE is able to access the cell based on the list of CAGs that allow the UE to access and the indication information about whether the UE is only allowed to access the CAG cell. The specific steps are described in the following process.

Step 1010: the DU transmits a UE context establishment response to the CU.

The context establishment request message carries the identifier on F1 of the UE, the successfully established bearer information or PDU session information, and the un-successfully established bearer information or PDU session information. After that, the process of configuring the bearer on the UE side by the CU is the same as the current process, and thus is omitted herein.

Step 1011: the CU transmits an initial context establishment response message to the AMF.

The CU transmits a response message of step 1008 to the AMF.

Figure 11:
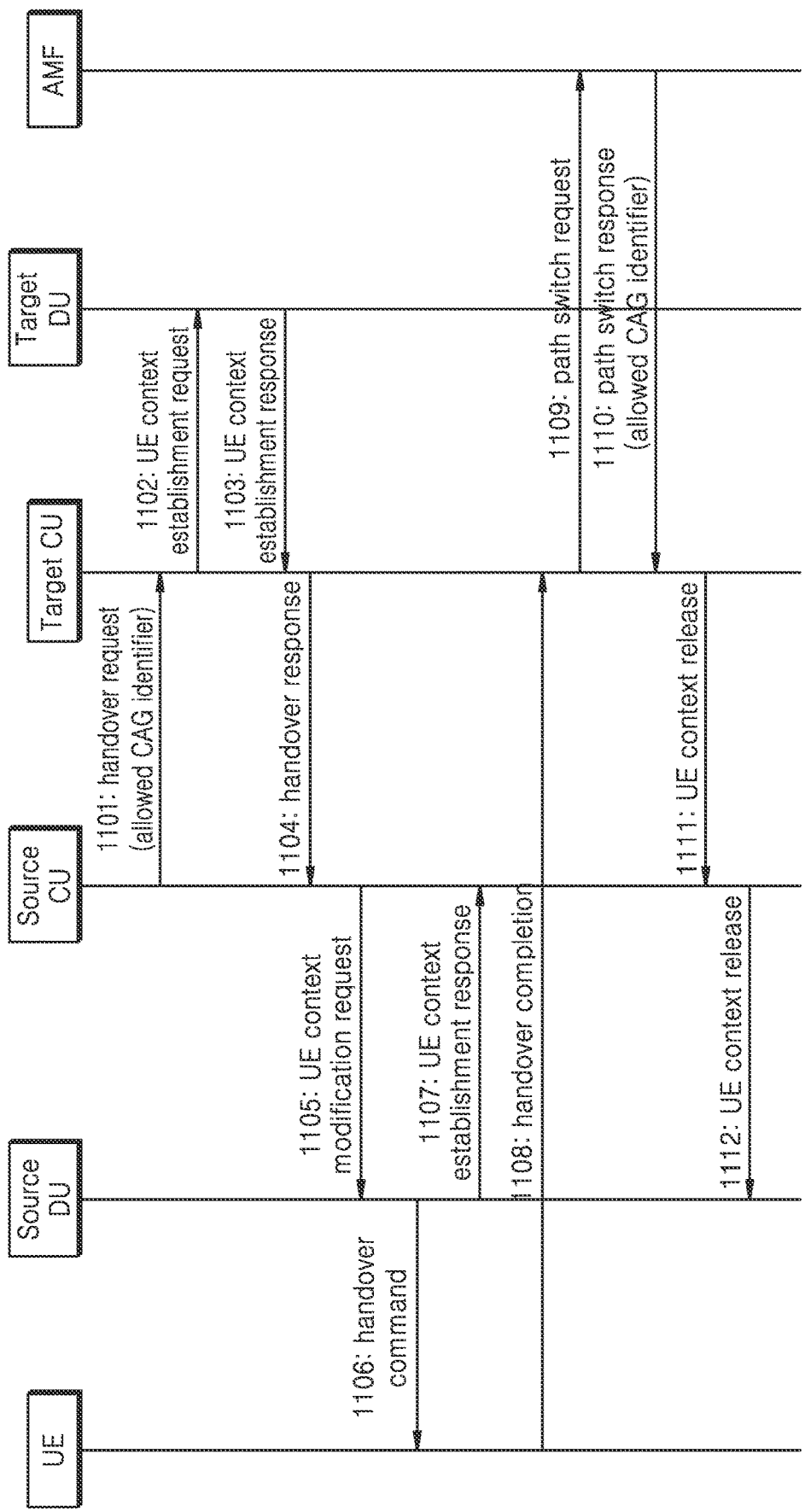
FIG. 11 is a schematic diagram of a process in which a UE performs Xn handover according to an embodiment of the present application.

FIG. 11 is a schematic diagram of a process in which a UE performs Xn handover according to an embodiment of the present application. The base station is separated into a base station centralized control unit (CU) and a base station distribution unit (DU), wherein one DU may be connected to multiple CUs, and one CU may be connected to multiple DUs. The base station may be a 5G base station, or an LTE base station, or a base station in another access mode. In this embodiment, a 5G base station is used as an example. If other systems are used, the corresponding interface and message names are changed accordingly. As shown in FIG. 11:

Step 1101: the CU of the source base station transmits a handover request message to the CU of the destination base station.

The CU of the source base station decides to switch the UE to the destination base station based on the UE measurement result. If the destination base station is a cell that does not support CAG, the source base station knows the CAG identifier of the destination cell from the Xn establishment process, and the UE is only allowed to access to the CAG cell, the source base station cannot switch the UE to the destination base station. If the destination cell supports CAG, but the identifier of CAG supported by the destination cell is not in the CAG list for allowing the UE to make access, the source base station cannot switch the UE to the destination base station. The source base station transmits a handover request message to the destination base station. The handover request message includes information of the destination base station and the destination cell. The message may also carry a list of CAGs that allow the UE to access, and the message also carries indication information about whether the UE is only allowed to access the CAG cell.

Figure 12:
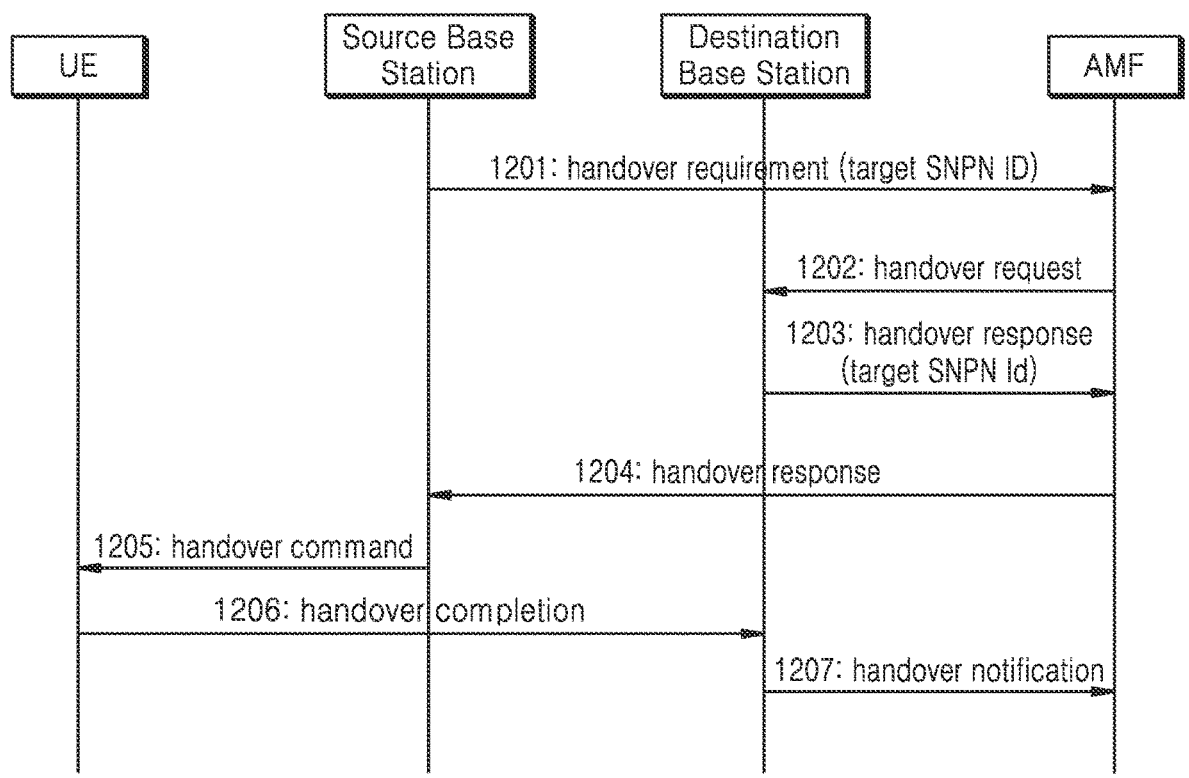
FIG. 12 is a schematic diagram of a process in which a UE performs NG handover according to an embodiment of the present application.

If the destination cell belongs to SNPN and the SNPN identifier of the destination cell is the same as that of the source cell, and the source base station obtains the SNPN identifier of the cell on the destination base station from the Xn establishment process, the source base station can decide to initiate the handover of the Xn process. If the destination cell belongs to SNPN, but the SNPN identifier of the destination cell is different from that of the source cell, the source base station does not initiate an Xn handover, but initiates an NG handover, so that the AMF identifies whether to allow the UE to switch to the destination cell/destination base station. The process of NG handover is shown in FIG. 12. If the destination cell does not belong to the SNPN, the source base station does not initiate a handover procedure to the destination cell.

Step 1102: the CU of destination base station transmits a UE context establishment request message to the DU of destination base station.

The context establishment request message carries the identifier on F1 of the UE, and bearer information or PDU session information to be established. It also carries a list of CAGs that allow the UE to access, and the message may also carry indication information about whether the UE is only allowed to access the CAG cell. The information is stored in the DU, and the DU may use the information as a basis for determining whether to allow the UE to access a certain cell.

Step 1103: the DU transmits a UE context establishment response to the CU.

The context establishment request message carries the identifier on F1 of the UE, the successfully established bearer information or PDU session information, and the unsuccessfully established bearer information or PDU session information.

Step 1104: the destination base station CU transmits a handover response message to the source base station CU.

The destination base station transmits a handover response message to the source base station. The message carries the identifier on the Xn interface of the UE, the bearer information or PDU session information accepted by the destination base station, and the handover command message to be transmitted to the UE.

Step 1105: the source base station CU transmits a UE context modification request to the source base station DU.

The source base station CU transmits the handover command transmitted by the destination base station to the DU through the message in step 1105.

Step 1106: the source base station DU transmits a handover command to the UE.

The source base station DU transmits a handover command transmitted by the destination base station to the UE.

Step 1107: the source base station DU transmits a UE context modification response to the source base station CU.

Step 1108: the UE synchronizes with the destination cell, and transmits a handover completion message to the destination base station CU.

Step 1109: the destination base station CU transmits a path switch request message to the core network AMF.

The path switch request message includes the identifier on the NG interface of the UE, the bearer information or the PDU session information to be switched, and the unique cell identity of the cell. If the destination cell is a cell that supports CAG, the message may also carry the CAG list of the cell. If the destination cell belongs to the SNPN, the message may also carry the PLMN identifier and network identifier (NID) of the cell.

Step 1110: the core network transmits a path switch response message to the destination base station CU.

The path switch response message includes the identifier on the NG interface of the UE, the successfully switched bearer information or the PDU session information, the switch response message includes a list of CAGs that allow the UE to access, and further includes indication information about whether the UE is only allowed to access the CAG cell.

In steps 1111 and 1112, the destination base station CU transmits the UE context release request message to the source base station CU, and the source base station CU transmits the UE context release request message to the source base station DU.

FIG. 12 is a schematic diagram of a process in which a UE performs NG handover according to an embodiment of the present application. In the current NG handover process, if the source base station and the destination base station belong to different local networks, and the UE performs a core network-based handover process, the core network does not know the identifier of the local network supported by the destination base station until the UE has switched to the destination base station, synchronized with the destination cell, and transmitted a handover completion message to the destination base station. The destination base station then transmits a handover notification message to the core network for notifying the core network of the local network identifiers supported by itself in the handover notification message. At this time, the core network must release all bearers. As can be seen, the data cannot be transmitted continuously when the current UE moves to another local network, and the core network does not know the local network identifier of the destination base station until the UE has switched to the destination base station, and the release process is also delayed for a long time, the UE has unnecessarily established a connection with the destination cell. Therefore, this embodiment uses an optimized method for enabling continuous data transmission and releasing the bearer in advance, and the UE does not need to establish an unnecessary RRC connection. As shown in FIG. 12:

Step 1201: the source base station transmits a handover required message to the AMF.

The CU of the source base station decides to switch the UE to the destination base station based on the UE measurement result. The message carries the identifier of the destination base station or the identifier of the destination cell. The message may also carry the SNPN identifier of the destination cell. The message may carry the CAG identifier and/or SNPN identifier of the source cell, and further carry the CAG identifier and/or SNPN identifier of the destination cell.

The source base station transmits a handover required message to the AMF over the NG interface in the following cases.

If there is an Xn interface between the source base station and the destination base station, the SNPN identifier of the cell on the destination base station is obtained from the Xn establishment process. If the destination cell belongs to the SNPN, but the SNPN identifier of the destination cell is different from that of the source cell, even if there is an Xn interface, the source base station does not initiate an Xn handover, but initiates an NG handover, so that the AMF identifies whether to allow the UE to switch to the destination cell/destination base station. If the SNPN identifier of the destination cell is the same as the SNPN identifier of the source cell, the source base station initiates the Xn handover process.

If there is not an Xn interface between the source base station and the destination base station, the source base station obtains the identifier of the destination cell from the UE measurement report. Alternatively, it can also obtain the SNPN identifier of the destination cell. If the SNPN identifier of the destination cell is the same as the SNPN identifier of the source cell, the source base station transmits the handover required message of the NG interface to the AMF. In the handover request message, the source base station may carry an indication information, through which the source base station notifies the AMF that the destination cell and the source cell belong to the same SNPN.

If there is not an Xn interface between the source base station and the destination base station, the source base station obtains the SNPN identifier of the destination cell from the UE measurement report. If the SNPN identifier of the destination cell is different from the SNPN identifier of the source cell, the source base station transmits the handover required message of the NG interface to the AMF.

If there is not an Xn interface between the source base station and the destination base station, the source base station does not know the SNPN identifier of the destination cell, and the source base station transmits the handover required message of the NG interface to the AMF.

I If there is not an Xn interface between the source base station and the destination base station, the source base station obtains the identifier of the destination cell and the CAG identifier of the destination cell from the UE measurement report, and the source base station transmits the handover required message of the NG interface to the AMF.

Step 1202: the AMF transmits a handover request to the destination base station.

The AMF receives the message of step 1201 and knows the SNPN identifier of the source cell, the SNPN identifier of the destination cell, or obtains the SNPN identifiers supported by the source cell and/or the destination cell during the NG interface establishment process. The AMF stores the authentication information of the UE, and the authentication information indicates which SNPNs may be accessed by the UE. Based on above information, the AMF determine whether to allow the UE to access the destination cell. If the SNPN identifier supported by the destination cell is not in the SNPN identifier list for allowing the UE to make access, the AMF determines that the UE is not allowed to access to the destination cell, and the AMF may directly transmit a handover failure message to the source base station. The message may indicate why the access was rejected, for example, the reason for the rejection is that the access is not allowed. If the access is allowed, the AMF transmits a handover request to the destination base station.

The AMF receives the message of step 1201 and knows the CAG identifier of the source cell, the CAG identifier of the destination cell, or obtains the CAG identifiers supported by the source cell and/or the destination cell during the NG interface establishment process. The AMF stores the authentication information of the UE, and the authentication information indicates which CAGs may be accessed by the UE. Based on above information, the AMF determine whether to allow the UE to access the destination cell. If the CAG identifier supported by the destination cell is not in the CAG identifier list for allowing the UE to make access, the AMF determines that the UE is not allowed to access to the destination cell, and the AMF may directly transmit a handover failure message to the source base station. The message may indicate why the access was rejected, for example, the reason for the rejection is that the access is not allowed. If the access is allowed, the AMF transmits a handover request to the destination base station.

The handover request message includes the identifier on the NG interface of the UE and information about the PDU session to be established.

Step 1203: the destination base station transmits a handover response to the AMF.

The message carries the identifier on the NG interface of the UE and the information of the accepted PDU session. The message may also carry the identifier of the destination cell and the SNPN identifier of the destination cell. The message may also carry the identifier of the destination cell and the CAG identifier of the destination cell. An RRC container in the handover response message contains the handover command to be transmitted to the UE.

If the identifier of the destination cell and the SNPN identifier of the destination cell are included in step 1203, the AMF receives the message of step 1203 and knows the SNPN identifier of the destination cell. The AMF stores the authentication information of the UE, and the authentication information indicates which SNPN s may be accessed by the UE. Based on above information, the AMF determine whether to allow the UE to access the destination cell. If the SNPN identifier supported by the destination cell is not in the SNPN identifier list for allowing the UE to make access, the AMF determines that the UE is not allowed to access to the destination cell, and the AMF may directly transmit a handover failure message to the source base station. The message may indicate why the access was rejected, for example, the reason for the rejection is that the access is not allowed. If the access is allowed, the AMF transmits a handover request to the destination base station.

If the identifier of the destination cell and the CAG identifier of the destination cell are included in step 1203, the AMF receives the message of step 1203 and knows the CAG identifier of the destination cell. The AMF stores the authentication information of the UE, and the authentication information indicates which CAGs may be accessed by the UE. Based on above information, the AMF determine whether to allow the UE to access the destination cell. If the CAG identifier supported by the destination cell is not in the CAG identifier list of allowing the UE to make access, the AMF determines that the UE is not allowed to access to the destination cell, and the AMF may directly transmit a handover failure message to the source base station. The message may indicate why the access was rejected, for example, the reason for the rejection is that the access is not allowed. If the access is allowed, the AMF transmits a handover request to the destination base station.

Step 1204: the AMF transmits a handover command message to the source base station.

The message confirms that the destination base station is ready for handover. The message carries the identifier on the NG interface of the UE and the information of the PDU session accepted by the destination base station.

Step 1205: the source base station transmits a handover command to the UE.

The source base station transmits a handover command generated by the destination base station to the UE.

Step 1206: the UE synchronizes with the destination cell and transmits a handover completion message to the destination base station.

Step 1207: the destination base station transmits a handover notification message to the core network AMF.

Figure 13:
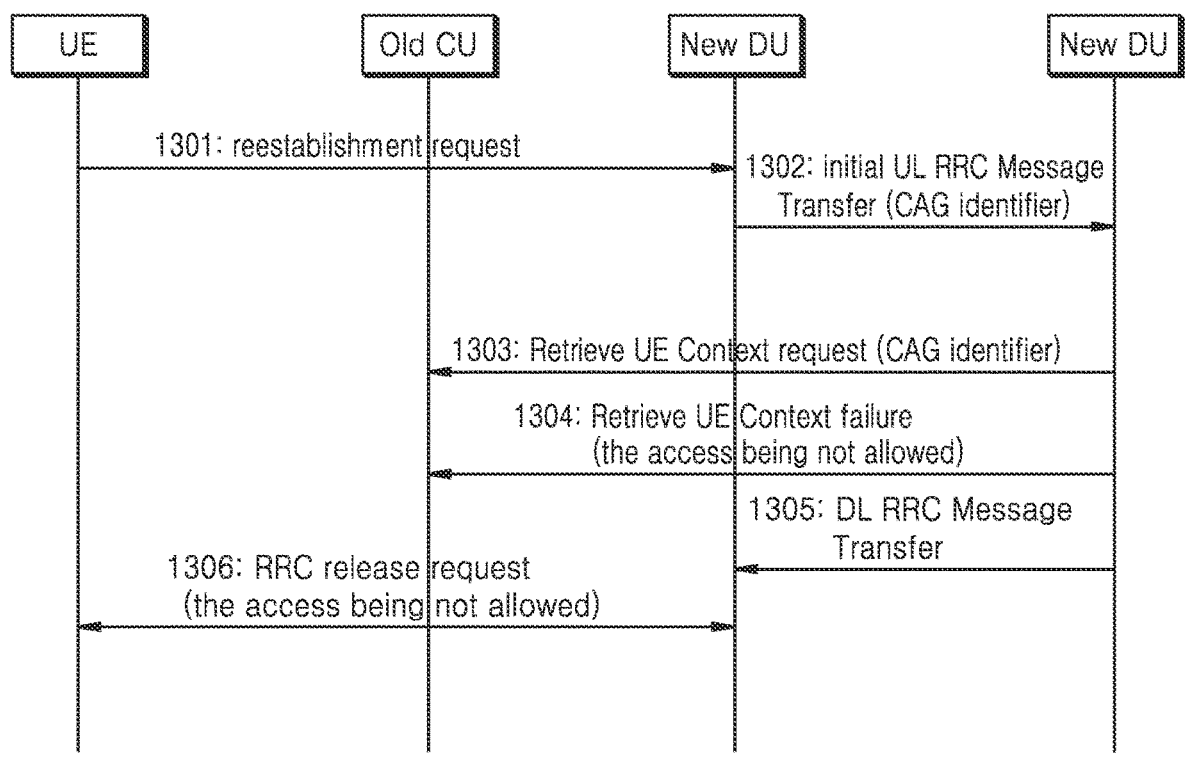
FIG. 13 is a schematic diagram of a process in which a UE reselects a new cell to initiate RRC reestablishment after the UE occurs radio link failure in an old cell according to an embodiment of the present application.

FIG. 13 is a schematic diagram of a process in which a UE reselects a new cell to initiate RRC reestablishment after the UE occurs radio link failure in an old cell according to an embodiment of the present application, or the UE is in an RRC inactive mode, and the UE moves to a new cell, and initiates the RRC recovery process. The base station is separated into a base station centralized control unit (CU) and a base station distribution unit (DU), wherein one DU may be connected to multiple CUs, and one CU may be connected to multiple DUs. The base station may be a 5G base station, or an LTE base station, or a base station in another access mode. In this embodiment, a 5G base station is used as an example. If other systems are used, the corresponding interface and message names are changed accordingly. FIG. 13 illustrates a process in which a UE reselects a new cell to initiate RRC reestablishment after the UE occurs radio link failure in an old cell. If the base station is not separated, the CU and the DU are on one entity, and the procedure of transmitting message between the CU and the DU may be omitted. The CU/DU in the embodiments can be directly replaced with a base station. Alternatively, the new base station is a first base station, and the old base station is a second base station. As shown in FIG. 13:

Step 1301: the UE transmits an RRC reestablishment request message to the new DU.

After the UE performs cell reselection, the UE transmits an RRC reestablishment request message to the base station in the reselected cell. The RRC reestablishment request message includes the reestablishment identifier of the UE. The reestablishment identifier of the UE is used to find the UE context and detect the physical layer identifier conflict. The reestablishment identifier of the UE includes the C-RNTI of the UE. This is the C-RNTI allocated by the old cell. The physical cell identifier (PCI) of the cell before the UE's radio link failure, that is, the old cell identity, includes the authentication token calculated by the UE (Short Mac-I). The RRC reestablishment request message also includes the reason for the RRC reconnection establishment. The reason for the RRC reestablishment may be set to reconfiguration failure, handover failure, etc.

If the UE being in inactive mode initiates the RRC recovery process, the UE transmits an RRC active request message to new DU. The message includes the identifier of the UE in the old cell. The identifier of the UE in the old cell includes the information of the old base station, the C-RNTI allocated by the new cell, the physical cell identifier (PCI) of the new cell, and the unique identifier across the entire new network.

If the DU may parse the RRC message, the DU knows that the message is an RRC reestablishment message. Based on the old cell identity PCI of the UE and the C-RNTI of the UE contained in the message, the DU may determine whether the old cell of the UE is on the DU. If the old cell of the UE is on the DU, the DU may find the stored context information, thereby knowing a list of CAGs that allow the UE to access, and the indication information about whether the UE is only allowed to access the CAG cell. If the cell that has received the UE reestablishment request supports CAG, but the CAG identifier of the cell is not in the list of CAGs that allow the UE to access, or the cell is not a CAG cell, and the above indication information indicates that the UE is only allowed to access CAG, the DU may directly reject the RRC reestablishment message. An RRC release request is transmitted to the UE. The reason for the release is that the UE is not allowed to access.

If the DU may parse the RRC message, the DU knows that the message is an RRC recovery request message. Based on the identifier of the UE in the old cell contained in the message, the DU may determine whether the old cell of the UE is on the DU. If the old cell is on the DU, the DU may find the stored context information, thereby knowing a list of CAGs that allow the UE to access, and the indication information about whether the UE is only allowed to access the CAG cell. If the cell that has received the RRC recovery request supports CAG, but the CAG identifier of the cell is not in the list of CAGs that allow the UE to access, or the cell is not a CAG cell, and the above indication information indicates that the UE is only allowed to access CAG, the DU may directly reject the RRC reestablishment message. An RRC release request is transmitted to the UE. The reason for the release is that the UE is not allowed to access.

Step 1302: the new DU transmits the initial UL RRC Message Transfer to the new CU, and the message carries the RRC reestablishment request message transmitted by the UE through the RRC container.

The DU transmits an "initial UL RRC Message Transfer" to the CU through the F1 interface, and the message name may be other names. The message also carries one or more of the following information:

The message carries the identifier on F1 allocated by the DU to the UE.

The message carries the cell identity C-RNTI allocated by the DU to the UE. The C-RNTI is a unique identifier used to identify the RRC connection and scheduling of the UE, which is the new C-RNTI allocated by the DU for the UE.

The message carries the global unique identifier of the cell in the RRC message received by DU, such as NG-CGI. The message also carries a container from DU to CU. The container from DU to CU contains cell group configuration information, and this information contains information required to establish SRB1.

The message also carries an RRC container, which contains the RRC message received by the DU from the UE.

If the cell that has received the RRC reestablishment request message or the RRC recovery request message is a cell that supports CAG, the message may further carry the CAG list of the cell. If the cell that has received the reestablishment request message or the RRC recovery request message belongs to the SNPN, the message may further carry the PLMN identifier and the network identifier (NID) of the cell.

Step 1303: the new CU transmits a Retrieve UE Context request message to the old CU.

The new CU1 parses the RRC reestablishment request message. Based on the reestablishment identifier of the UE contained in the message, the new CU1 determines that the context of the UE is on another NG-RAN entity. The CU obtains information of serving cells of the neighboring base stations when the CU establishes an Xn interface with the other base stations, wherein the information of the serving cell includes the frequency of the cell, the physical cell identifier (PCI), the cell global unique identifier NR-CGI, the routing identifier of the cell TAC, etc., so the CU1 knows the physical cell identifier (PCI) on other NG-RAN. Based on the PCI of the failed cell in the reestablishment identifier, the new CU1 determines that the UE context is on another NG-RAN entity. The new CU transmits the Retrieve UE Context request message to the old CU.

The new CU parses the RRC recovery request message. Based on the identifier of the UE in the old cell contained in the message, the identifier of the UE in the old cell contains the information of the old base station NG-RAN, so the new CU1 may determine that the context of the UE is on another NG-RAN entity. The new CU (CU1) transmits a Retrieve UE Context request message to the old CU (CU2).

The Retrieve UE Context request message includes a UE context identifier. For the RRC reestablishment process, the UE context identifier is the C-RNTI and the PCI of the failed cell. The C-RNTI is an identifier assigned to the UE by the serving cell of the UE before the radio link fails. The message also contains the cell identity of the new cell. If the cell that has received the RRC connection request is a cell that supports CAG, the message may further carry the CAG list of the cell. If the cell that has received the RRC connection request belongs to the SNPN, the message may further carry the PLMN identifier and the network identifier (NID) of the cell.

For the RRC recovery process, the UE context identifier includes the identifier of the UE in the old cell, the temporary C-RNTI of the UE allocated by the new cell (i.e., the cell that received the RRC recovery request), and the PCI of the new cell. The message also contains the unique cell identity of the new cell, such as CGI, and the reason for RRC recovery. The message also contains the cell identity of the new cell. If the cell that has received the RRC connection request is a cell that supports CAG, the message may also carry the CAG list of the cell. If the cell that has received the RRC connection request belongs to the SNPN, the message may also carry the PLMN identifier and the network identifier (NID) of the cell.

Step 1304: the old CU transmits a Retrieve UE Context failure message or a Retrieve UE Context response message to the new CU.

The old CU determines whether to transmit the UE context information to the new CU based the stored list of CAGs that allow the UE to access, and/or the indication information about whether the UE is only allowed to access the CAG cell. If the new cell on the new CU (i.e., the cell for performing RRC reestablishment or RRC recovery) is a cell that does not support CAG, the old cell may know the identifier of the CAG supported by the new cell from the Xn interface establishment process, or in step 1304, knows the identifier of the CAG supported by the new cell, and the UE is only allowed to access to the CAG cell, the old CU cannot transmit UE context information to the new CU. If the new cell supports CAG, but the CAG identifier supported by the new cell is not in the list of CAGs that allow the UE to access, the old CU cannot transmit UE context information to the CU at where the new cell is located. The old CU transmits the Retrieve UE Context failure message to the new CU. The Retrieve UE Context failure message contains the reason for rejection, for example, the reason for the rejection is that the cell is not allowed to be accessed.

If the old cell belongs to the SNPN and the new cell belongs to the SNPN, but the SNPN identifier of the new cell is different from the SNPN identifier of the old cell, that is, the two cells belong to different standalone non-public networks, the old CU cannot transmit UE context information to the new cell CU. The old CU transmits the Retrieve UE Context failure message to the new CU. The Retrieve UE Context failure message contains the reason for rejection, for example, the reason for the rejection is that the access is not allowed. If the SNPN identifier of the new cell is the same as the SNPN identifier of the old cell, the context information of the UE may be transmitted to the new CU.

If the UE context can be transmitted to the new CU, the old CU transmits the Retrieve UE Context response message to the new CU, wherein the Retrieve UE Context response message contains the context information of the UE. The context information or the Retrieve UE Context response message contains the list of CAGs that allow the UE to access, and the indication information about whether the UE is only allowed to access the CAG cell.

Step 1305: the new CU transmits a DL RRC Message Transfer to the new DU. The message name may be another name or a newly defined message. The message carries an RRC release request message, or the message carries an RRC reestablishment response message, or the message carries an RRC recovery response message or RRC recovery failure message.

If the Retrieve UE Context failure message is received in step 1304, the CU transmits an RRC release request message to the UE, or the RRC active failure message. If the Retrieve UE Context response message is received in step 1304, the CU transmits an RRC reestablishment response or RRC recovery response message to the UE. The message is firstly transmitted to the DU through the downlink RRC message over the F1 interface, and then transmitted by the DU to the UE.

Step 1306: the new DU transmits an RRC release request or an RRC reestablishment response message to the UE.

Figure 14:
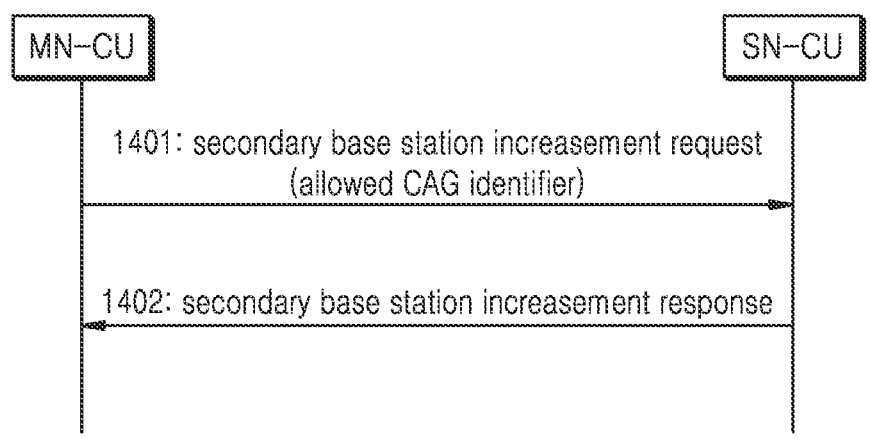
FIG. 14 is a schematic diagram of a process of establishing a dual connection according to an embodiment of the present application.

FIG. 14 is a schematic diagram of a process of establishing a dual connection according to an embodiment of the present application. As shown in FIG. 14:

Step 1401: the primary base station transmits a secondary base station establishment request message to the secondary base station. The message carries a list of CAGs that allow the UE to access, and the indication information about whether the UE is only allowed to access the CAG cell.

When the secondary base station selects a secondary cell, it must refer to the list of CAGs that allow the UE to access. If the cell is a CAG cell and the CAG identifier of the cell is not in the list of CAGs that allow the UE to access, the cell cannot be selected as the secondary cell. Alternatively, the cell does not support CAG, and the UE can only access CAG, then the cell cannot be selected as the secondary cell.

Step 1402: the secondary base station transmits a secondary base station establishment response message to the primary base station.

Embodiment 3

Figure 15A:
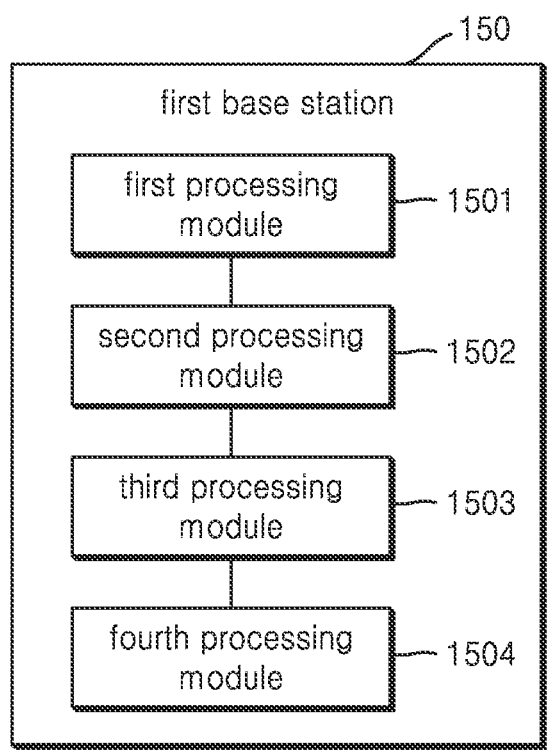
FIG. 15*a* is a schematic structural diagram of a first base station according to an embodiment of the present application.

Based on the same inventive concepts of the above first and second embodiments, this embodiment of the present application further provides a first base station. The structural diagram of the device is as shown in FIG. 15*a*. The first base station 150 includes a first processing module 1501, a second processing module 1502, a third processing module 1503, and a fourth processing module 1504.

The first processing module 1501 is configured to receive a radio resource control (RRC) reestablishment request transmitted by a user equipment (UE);

The second processing module 1502 is configured to transmit a Retrieve UE Context request to a second base station based on the RRC reestablishment request;

The third processing module 1503 is configured to receive a Retrieve UE Context response message transmitted by the second base station, wherein the Retrieve UE Context response message is determined by the second base station based on a first decision rule;

The fourth processing module 1504 is configured to transmit an RRC reestablishment response message to the UE to support the UE for accessing to a closed network based on the Retrieve UE Context response message, wherein the closed network comprises at least one of a closed access group (CAG) and a standalone non-public network (SNPN).

Alternatively, the first decision rule includes at least one of the following:

The second base station determines whether the CAG supported by a cell of the first base station is in a CAG identifiers list allowed by the UE, and if it is, a Retrieve UE Context response message is transmitted to the first base station, and if not, a Retrieve UE Context failure message is transmitted to the first base station;

The second base station determines whether a SNPN identifier for the cell of the first base station is the same as a SNPN identifier for a cell of the second base station, and if it is, the Retrieve UE Context response message is transmitted to the first base station, if not, the Retrieve UE Context failure message is transmitted to the first base station.

For the content that is not described in detail in the first base station provided in the embodiment of the present application, reference may be made to the foregoing method for supporting access to the closed network. The beneficial effects that can be achieved by the first base station provided in the embodiment of the present application are the same as that achieved by the above described method for supporting access to the closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 4

Figure 15B:
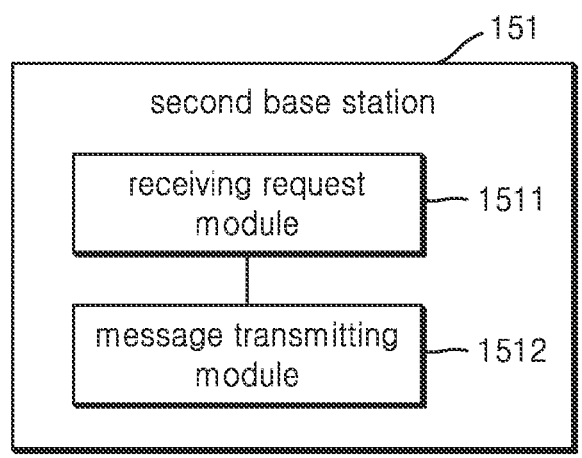
FIG. 15*b* is a schematic structural diagram of a second base station according to an embodiment of the present application.

Based on the same inventive concepts of the above first and second embodiments, this embodiment of the present application further provides a second base station. The structural diagram of the device is as shown in FIG. 15b. The second base station 151 includes a receiving request module 1511 and a message transmitting module 1512.

The receiving request module 1511 is configured to receive a Retrieve UE Context request transmitted by a first base station; and The message transmitting module 1512 is configured to transmit a Retrieve UE Context response message to the first base station, the Retrieve UE Context response message is determined based on a first decision rule to support the UE for accessing to a closed network, wherein the closed network comprises at least one of a closed access group (CAG) and a standalone non-public network (SNPN).

Alternatively, the first decision rule includes at least one of the following:

The second base station determines whether the CAG supported by a cell of the first base station is in a CAG identifiers list allowed by the UE, and if it is, a Retrieve UE Context response message is transmitted to the first base station, and if not, a Retrieve UE Context failure message is transmitted to the first base station;

The second base station determines whether a SNPN identifier for the cell of the first base station is the same as a SNPN identifier for a cell of the second base station, and if it is, the Retrieve UE Context response message is transmitted to the first base station, if not, the Retrieve UE Context failure message is transmitted to the first base station.

For the content that is not described in detail in the second base station provided in the embodiment of the present application, reference may be made to the foregoing method for supporting access to the closed network. The beneficial effects that can be achieved by the second base station provided in the embodiment of the present application are the same as that achieved by the above described method for supporting access to the closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 5

Figure 16:
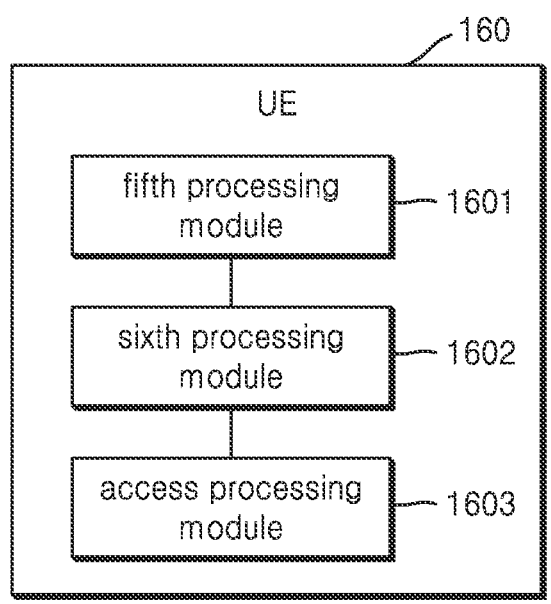
FIG. 16 is a schematic structural diagram of a UE according to an embodiment of the present application.

Based on the same inventive concepts of the above first and second embodiments, this embodiment of the present application further provides a UE. The structural diagram of the device is as shown in FIG. 16. The UE 160 includes a fifth processing module 1601, a sixth processing module 1602, and an access processing module 1603.

The fifth processing module 1601 is configured to transmit an RRC reestablishment request to a first base station;

The sixth processing module 1602 is configured to receive an RRC reestablishment response message transmitted by the first base station;

The access processing module 1603 is configured to access to a closed network, wherein the closed network comprises at least one of a closed access group (CAG) and a standalone non-public network (SNPN).

For the content that is not described in detail in the UE provided in the embodiment of the present application, reference may be made to the foregoing method for supporting access to a closed network. The beneficial effects that can be achieved by the UE provided in the embodiment of the present application are the same as that achieved by the above described method for supporting access to a closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 6

Figure 17:
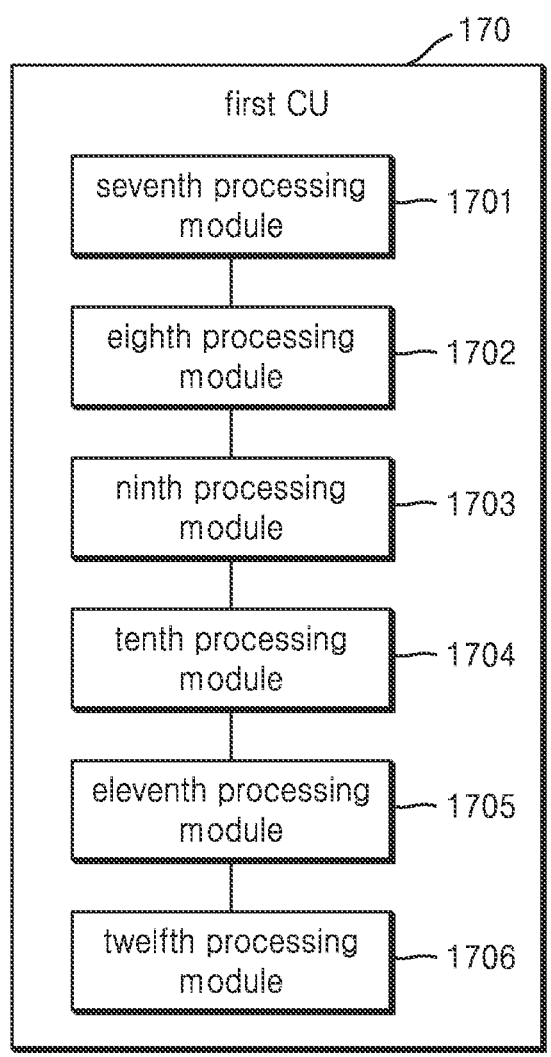
FIG. 17 is a schematic structural diagram of a first CU according to an embodiment of the present application.

Based on the same inventive concepts of the above first and second embodiments, this embodiment of the present application also provides a first CU. The structural diagram of the device is as shown in FIG. 17. The first CU 170 includes a seventh processing module 1701, an eighth processing module 1702, a ninth processing module 1703, a tenth processing module 1704, an eleventh processing module 1705, and a twelfth processing module 1706.

The seventh processing module 1701 is configured to receive an F1 establishment request transmitted by a distribution unit (DU), wherein the F1 establishment request comprises at least one of a closed access group (CAG) identifiers list and a standalone non-public network (SNPN) identifier;

The eighth processing module 1702 is configured to transmit an NG establishment request to an access and mobility management function (AMF) of a core network, wherein the NG establishment request comprises at least one of the CAG identifiers list of and the SNPN identifier;

The ninth processing module 1703 is configured to receive an NG establishment response transmitted by the AMF;

The tenth processing module 1704 is configured to transmit transmitting an F1 establishment response to the DU;

The eleventh processing module 1705 is configured to transmit an Xn establishment request to a second CU, wherein the Xn establishment request comprises at least one of a CAG identifiers list and/or a SNPN identifier to support UE for accessing to a closed network, wherein the closed network comprises at least one of CAG and SNPN;

The twelfth processing module 1706 is configured to receive an Xn establishment response transmitted by the second CU, wherein the Xn establishment response comprises at least one of a CAG identifiers list and/or a SNPN identifier to support UE for accessing to the closed network, wherein the closed network comprises at least one of the CAG and the SNPN.

Alternatively, when the F1 establishment request includes the CAG identifiers list, information carried by the NG establishment request comprises at least one of the following:

an identifier of a base station, a routing area of the base station, an operator identifier of the base station, a CAG identifiers list supported by the base station, and information about cells supported by the base station, wherein the information about cells supported by the base station comprises a cell identity, a cell operator identifier, a cell routing area identifier, and a CAG identifiers list supported by the cell.

Alternatively, when the F1 establishment request includes the SNPN identifier, information carried by the NG establishment request comprises at least one of the following:

a public land mobile network (PLMN) identifier, and a network identifier (NID).

For the content that is not described in detail in the first CU provided in the embodiment of the present application, reference may be made to the foregoing method for supporting access to the closed network. The beneficial effects that can be achieved by the first CU provided in the embodiment of the present application are the same as that achieved by the above described method for supporting access to the closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 7

Figure 18:
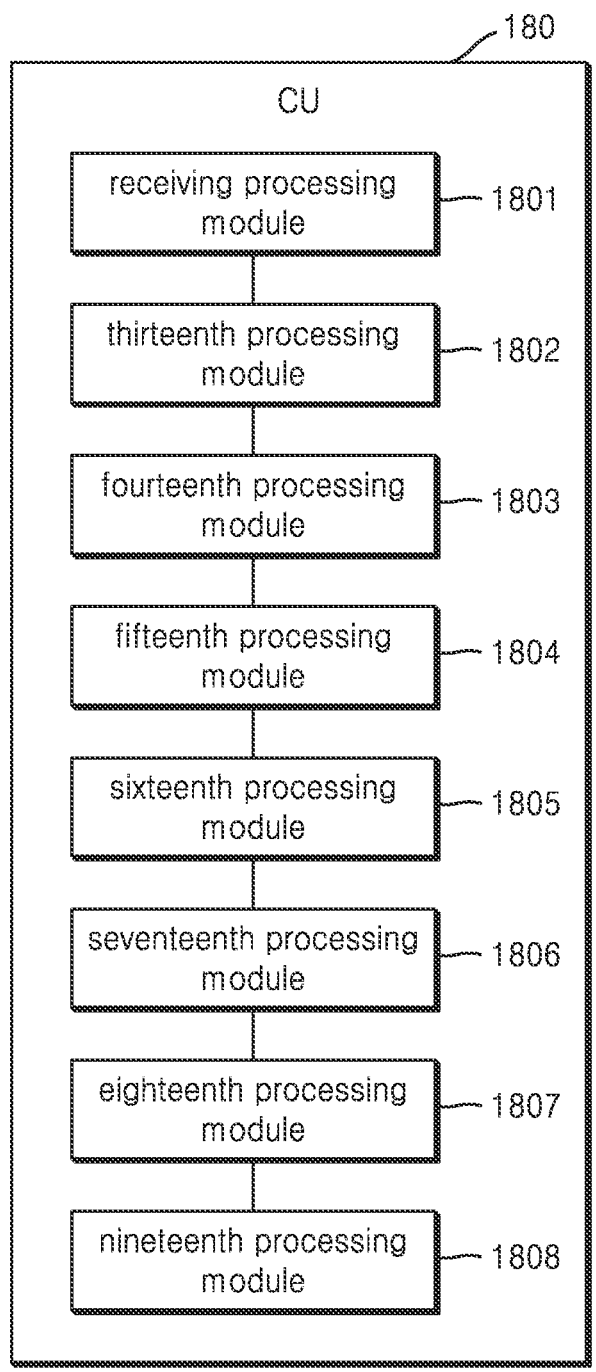
FIG. 18 is a schematic structural diagram of a CU according to an embodiment of the present application.

Based on the same inventive concepts of the above first and second embodiments, this embodiment of the present application also provides a CU. The structural diagram of the device is as shown in FIG. 18, and the CU 180 includes a receiving processing module 1801, a thirteenth processing module 1802, a fourteenth processing module 1803, a fifteenth processing module 1804, a sixteenth processing module 1805, a seventeenth processing module 1806, an eighteenth processing module 1807, and a nineteenth processing module 1808.

The receiving processing module 1801 is configured to configured to receive an initial UL RRC Message Transfer transmitted by a DU;

The thirteenth processing module 1802 is configured to transmit a DL RRC Message Transfer to the DU;

The fourteenth processing module 1803 is configured to receive an UL RRC Message Transfer transmitted by the DU;

The fifteenth processing module 1804 is configured to transmit an initial UE message to an AMF, wherein the initial UE message comprises at least one of a cell global unique identifier of the cell at which the UE is located, a CAG identifiers list supported by the cell, a PLMN identifier, and a NID;

The sixteenth processing module 1805 is configured to receive an initial context establishment request message transmitted by the AMF;

The seventeenth processing module 1806 is configured to transmit a UE context establishment request message to the DU, wherein the UE context establishment request message comprises at least one of a CAG identifiers list in which the UE is allowed to access and indication information for indicating whether the UE is only allowed to access the CAG cell;

The eighteenth processing module 1807 is configured to receive a UE context establishment response transmitted by the DU;

The nineteenth processing module 1808 is configured to transmit an initial context establishment response message to the AMF to support the UE for accessing to a closed network, wherein the closed network comprises at least one of CAG and SNPN.

Alternatively, the initial UL RRC Message Transfer includes at least one of the following:

an identifier on F1 allocated by the DU to the UE;

a cell global identifier (CGI) of the cell accessed by the UE;

if the cell accessed by the UE supports the CAG, the initial UL RRC Message Transfer further carries the CAG identifiers list supported by the cell;

if the cell accessed by the UE belongs to the SNPN, the initial UL RRC Message Transfer further carries the PLMN identifier and the NID;

a cell-radio network temporary identifier (C-RNTI) allocated by the DU to the UE, the C-RNTI is a unique identifier used to identify the RRC connection and scheduling of the UE;

RRC container from the DU to the CU, wherein the RRC container includes cell group configuration information which includes information required to establish SRB1.

Alternatively, the initial context establishment request message includes at least one of the following:

an identifier of the NG interface allocated by the AMF to the UE, wireless capability of the UE, encryption capability of the UE, information related to the establishment of data session, a CAG identifiers list in which the UE is allowed to access and indication information for indicating whether the UE is only allowed to access the CAG cell.

For the content that is not described in detail in the CU provided in the embodiment of the present application, reference may be made to the foregoing method for supporting access to a closed network. The beneficial effects achieved by the CU provided in the embodiment of the present application are the same as that achieved by the above method for supporting access to a closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 8

Figure 19:
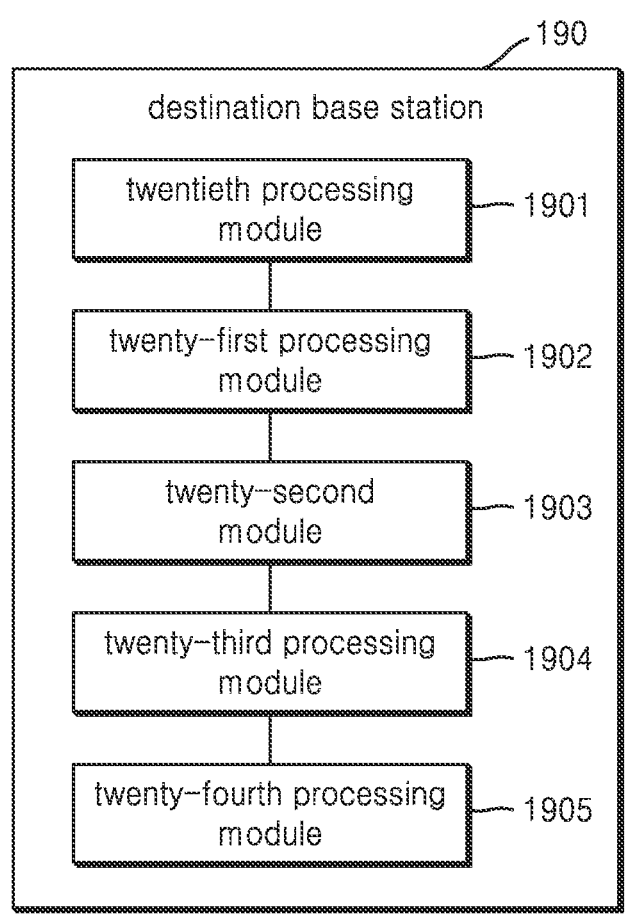
FIG. 19 is a schematic structural diagram of a destination base station according to an embodiment of the present application.

Based on the same inventive concepts of the above first and second embodiments, this embodiment of the present application also provides a destination base station. The structural diagram of the device is as shown in FIG. 19. The destination base station 190 includes a twentieth processing module 1901, a twenty-first processing module 1902, a twenty-second processing module 1903, a twenty-third processing module 1904, and a twenty-fourth processing module 1905.

The twentieth processing module 1901 is configured to receive a handover request message transmitted by a source base station, wherein the handover request message comprises at least one of information of a destination base station, information of a destination cell, a CAG identifiers list in which the UE is allowed to access and indication information for indicating whether the UE is only allowed to access the CAG cell;

The twenty-first processing module 1902 is configured to transmit a handover response message to the source base station;

The twenty-second processing module 1903 is configured to receive a handover completion message for the UE switching from the source base station to the destination base station;

The twenty-third processing module 1904 is configured to transmit a path switch request message to the AMF, wherein the path switch request message comprises at least one of a CAG identifiers list for a cell, a PLMN identifier for a cell, and a NID;

The twenty-fourth processing module 1905 is configured to receive a path switch response message transmitted by the AMF, wherein the path switch response message comprises at least one of a CAG identifiers list in which the UE is allowed to access and indication information for indicating whether the UE is only allowed to access the CAG cell, to support the UE for accessing to a closed network, wherein the closed network comprises at least one of CAG and SNPN.

For the content that is not described in detail in the destination base station provided in the embodiment of the present application, reference may be made to the above method for supporting access to a closed network. The beneficial effects provided by the destination base station provided in the embodiment of the present application are the same as that achieved by the above method for supporting access to a closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 9

Figure 20:
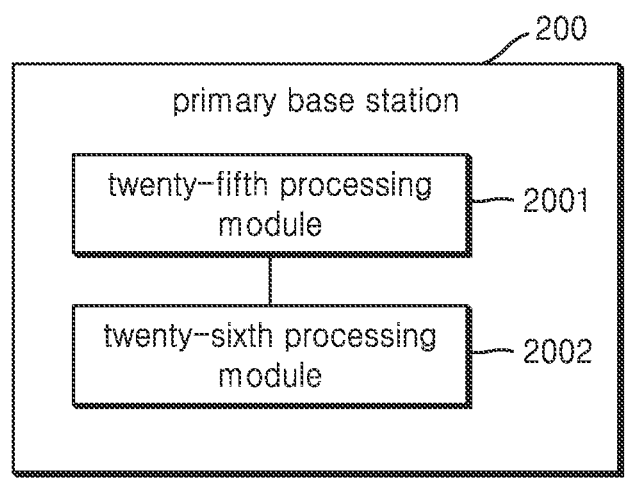
FIG. 20 is a schematic structural diagram of a primary base station according to an embodiment of the present application.

Based on the same inventive concepts of the above first and second embodiments, this embodiment of the present application further provides a primary base station. The structural diagram of the device is as shown in FIG. 20. The primary base station 200 includes a twenty-fifth processing module 2001 and a twenty-sixth processing module 2002.

The twenty-fifth processing module 2001 is configured to transmit a secondary base station establishment request message to a secondary base station, wherein the secondary base station establishment request message comprises at least one of a CAG identifiers list in which the UE is allowed to access and indication information for indicating whether the UE is only allowed to access the CAG cell;

The twenty-sixth processing module 2002 is configured to receive a secondary base station establishment response message transmitted by the secondary base station to support the UE for accessing to a closed network, wherein the closed network comprises at least one of CAG and SNPN.

For the content that is not described in detail in the primary base station provided in this embodiment of the present application, reference may be made to the above method for supporting access to the closed network. The beneficial effects provided by the primary base station provided in the embodiment of the present application are the same as that achieved by the above method for supporting access to the closed network, which are not repeated here.

The embodiments of the present application have at least the following advantages: enabling users of a closed access group (CAG) or users belonging to a standalone non-public network (SNPN) to access the corresponding CAG cell or the SNPN cell.

Embodiment 10

Based on the same inventive concepts of the above first and second embodiments, the embodiments of the present application provide a computer-readable storage medium storing a computer program that, when executed by a processor, implement the method for supporting access to the closed network according to any one of embodiments 1 and 2.

The computer-readable storage medium provided in the embodiments of the present application includes, but is not limited to, any type of disk (including a floppy disk, hard disk, optical disk, CD-ROM, and magneto-optical disk), read-only memory (ROM), and random access memory (RAM), erasable programmable read-only memory (EPROM), electrically erasable programmable read-only memory (EEPROM), flash, magnetic card or light card. That is, a readable storage medium includes any medium that stores or transfers information in a readable form by a device (e.g., a computer).

The embodiments of the present application have at least the following advantages: enabling users of a closed access group (CAG) or users belonging to a standalone non-public network (SNPN) to access the corresponding CAG cell or the SNPN cell.

Embodiment 11

Figure 21:
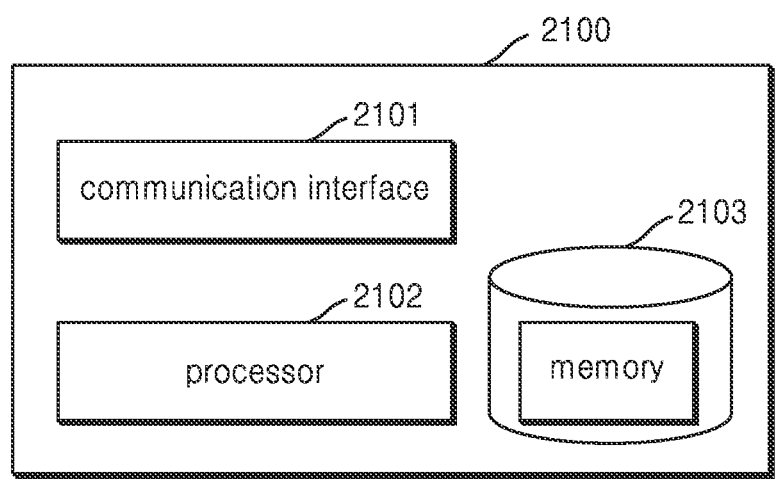
FIG. 21 is a schematic structural diagram of a base station or a CU of the base station or a DU of the base station according to an embodiment of the present application.

FIG. 21 schematically illustrates a structural block diagram of a base station or a base station CU or a base station DU that performs a method of the present application according to an embodiment of the present application. As shown in FIG. 21, the base station CU 2100 or the base station DU 2100 includes: a communication interface 2101 for external communication; a processing unit or a processor 2102, which may be a single unit or a combination of multiple units for performing different steps of the method for supporting access to a closed network; a memory 2103, which stores computer-executable instructions that, when executed by the processor 2102, cause the primary base station or the secondary base station to perform the embodiments in this application. However, all of the illustrated components are not essential. The the base station CU 2100 or the base station DU 2100 may be implemented by more or less components than those illustrated in FIG. 21.

The communication interface 2101 may include a transceiver. The transceiver may include a RF transmitter for up-converting and amplifying a transmitted signal, and a RF receiver for down-converting a frequency of a received signal. However, according to another embodiment, transceiver may be implemented by more or less components than those illustrated in components.

The communication interface 2101 may be connected to the processor 2102 and transmit and/or receive a signal. The signal may include control information and data. In addition, the communication interface 2101 may receive the signal through a wireless channel and output the signal to the processor 2102. The communication interface 2101 may transmit a signal output from the processor 2102 through the wireless channel.

The processor 2102 may include one or more processors or other processing devices that control the proposed function, process, and/or method. Operation of the the base station CU 2100 or the base station DU 2100 may be implemented by the processor 2102.

When the instructions are executed by the processor 2102, if the CU shown in FIG. 21 is new, the primary base station 2100 performs the following operations: transmitting the Retrieve UE Context request message to the old CU through the communication interface 2101, wherein the message carries the identity of the new cell, and also carries the CAG identifier or SNPN identifier supported by the cell; receiving the response message from the old CU through the communication interface 2101; and transmitting an RRC message to the UE based on the response information.

Alternatively, the Retrieve UE Context request includes one or more of the following information:

UE context identifier C-RNTI and PCI of the failed cell;
the identity of the new cell accessed by the UE; and
CAG identifier or SNPN identifier supported by the cell.

Alternatively, the Retrieve UE Context failure message includes the reason for the failure.

The processor 2102 may be a single central processing unit (CPU), but also include two or more processing units. Alternatively, the processor may include a general-purpose microprocessor, an instruction set processor and/or an associated chipset and/or a special-purpose microprocessor (e.g., an application-specific integrated circuit (ASIC)). The processor may also include on-board memory for caching usage. The computer program may be carried by a computer program product connected to a processor. The computer program product may include a computer-readable medium having a computer program stored thereon. For example, the computer program product may be a flash memory, a random access memory (RAM), a read-only memory (ROM), and an EEPROM; and in the alternative embodiment, the computer program module may be distributed to different computer program products in the form of a memory in the UE.

The embodiments of the present application have at least the following advantages: enabling users of a closed access group (CAG) or users belonging to a standalone non-public network (SNPN) to access the corresponding CAG cell or the SNPN cell.

It should be appreciated by the person skilled in the art that each block as well as the combination of the blocks in the structural block graphs and/or block graphs and/or flowcharts may be implemented through computer program instructions. It should be appreciated by the person skilled in the art that these computer program instructions may be provided to general-purpose computer, dedicated computer or other processors capable of programming the data processing methods, to generate machines, so as to implement the methods specified in the block(s) of the structural block graphs and/or block graphs and/or flowcharts through the instructions executed on the computer or other processors capable of programming the data processing methods.

It should be appreciated by the person skilled in the art that the various operations, methods, steps in the flow, measures and schemes discussed in the present application can be alternated, modified, combined or deleted. Furthermore, other operations, methods, steps in the flow, measures and schemes involving the various operations, methods, steps in the flow, measures and schemes discussed in the present application may also be alternated, modified, rearranged, dissolved, combined or deleted. Furthermore, other operations, methods, steps in the flow, measures and schemes having the same functions with the various operations, methods, steps in the flow, measures and schemes discussed in the present application may also be alternated, modified, re-arranged, dissolved, combined or deleted.

The above description is only part of the embodiments of the present application. It should be noted that, for those of ordinary skill in the art, without departing from the principles of the present application, several improvements and retouches can be made. These improvements and retouches also should be regarded as the protection scope of the present application.

The invention claimed is:

1. A method for supporting a non-public network (NPN), by a base station, in a wireless communication system, the method comprising:
    transmitting, to an access and mobility management function (AMF), an initial user equipment (UE) message comprising a closed access group (CAG) identifier list supported by a cell accessed by a UE;
    receiving, from the AMF, an initial context setup request message comprising access allowance information for CAG cells, wherein the access allowance information of the initial context setup request message comprises an allowed CAG list of the UE and information indicating whether the UE is allowed to access non-CAG cells;
    transmitting, to a secondary base station, a secondary base station establishment request message comprising the allowed CAG list of the UE and the information indicating whether the UE is allowed to access non-CAG cells;
    determining a target cell based on the access allowance information;
    transmitting a handover request message comprising the information indicating whether the UE is allowed to access non-CAG cells to a target base station; and
    receiving a handover request response message comprising a handover command message from the target base station.

2. The method of claim 1, further comprising:
    based on the target cell being a CAG cell and a CAG identifier supported by the target cell not being in the allowed CAG list, determining not to handover the UE to the target cell.

3. The method of claim 1, further comprising:
    based on the target cell being a non-CAG cell and the UE being only allowed to access CAG cells, determining not to handover the UE to the target cell.

4. The method of claim 1, further comprising:
    transmitting the handover command message to the UE.

5. A base station supporting a non-public network (NPN) in a wireless communication system, the base station comprising:
    a transceiver; and
    at least one processor configured to:
        transmit, to an access and mobility management function (AMF), an initial user equipment (UE) message comprising a closed access group (CAG) identifier list supported by a cell accessed by a UE,
        receive, from the AMF, an initial context setup request message comprising access allowance information for CAG cells, wherein the access allowance information of the initial context setup request message comprises an allowed CAG list of the UE and information indicating whether the UE is allowed to access non-CAG cells, transmit, to a secondary base station, a secondary base station establishment request message comprising the allowed CAG list of the UE and the information indicating whether the UE is allowed to access non-CAG cells, determine a target cell based on the access allowance information, transmit a handover request message comprising the information indicating whether the UE is allowed to access non-CAG cells to a target base station, and receive a handover request response message comprising a handover command message from the target base station.

6. The base station of claim 5, wherein the at least one processor is further configured to:

based on the target cell being a CAG cell and a CAG identifier supported by the target cell not being in the allowed CAG list, determine not to handover the UE to the target cell.

7. The base station of claim 5, wherein the at least one processor is further configured to:

based on the target cell being a non-CAG cell and the UE being only allowed to access CAG cells, determine not to handover the UE to the target cell.

8. The base station of claim 5, wherein the at least one processor is further configured to:

transmit the handover command message to the UE.

* * * * *